United States Patent
Kearfott

(10) Patent No.: US 12,326,534 B2
(45) Date of Patent: Jun. 10, 2025

(54) RAPID CHARACTERIZATION OF THE SOURCES OF ELECTROMAGNETIC SIGNALS AND ENVIRONMENTAL SUBSTANCES

(71) Applicant: THE REGENTS OF THE UNIVERSITY OF MICHIGAN, Ann Arbor, MI (US)

(72) Inventor: Kimberlee Jane Kearfott, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 553 days.

(21) Appl. No.: 17/284,124

(22) PCT Filed: Oct. 24, 2019

(86) PCT No.: PCT/US2019/057927
§ 371 (c)(1),
(2) Date: Apr. 9, 2021

(87) PCT Pub. No.: WO2020/086888
PCT Pub. Date: Apr. 30, 2020

(65) Prior Publication Data
US 2022/0373708 A1    Nov. 24, 2022

Related U.S. Application Data

(60) Provisional application No. 62/750,298, filed on Oct. 25, 2018.

(51) Int. Cl.
*G01V 3/16* (2006.01)
*G01J 3/45* (2006.01)
(Continued)

(52) U.S. Cl.
CPC .................. *G01V 3/16* (2013.01); *G01J 3/45* (2013.01); *G01S 5/0269* (2020.05); *G01V 3/17* (2013.01); *G01V 3/38* (2013.01); *G01S 2205/03* (2020.05)

(58) Field of Classification Search
CPC ... G01V 3/16; G01V 3/45; G01V 3/17; G01V 3/38
See application file for complete search history.

(56) References Cited

U.S. PATENT DOCUMENTS

| | | | |
|---|---|---|---|
| 2002/0043976 A1 | 4/2002 | Holladay et al. | |
| 2003/0052684 A1 | 3/2003 | Nelson et al. | |

(Continued)

FOREIGN PATENT DOCUMENTS

| | | | | | |
|---|---|---|---|---|---|
| CN | 105676004 A | * | 6/2016 | ......... | G01R 29/0857 |
| CN | 117607997 B | * | 7/2024 | ............ | G01S 19/33 |

(Continued)

OTHER PUBLICATIONS

International Search Report and Written Opinion of the International Application issued in PCT/US2019/057927, mailed Mar. 3, 2020; ISA/US.

*Primary Examiner* — Dani Fox
*Assistant Examiner* — Casey Bryant
(74) *Attorney, Agent, or Firm* — Harness, Dickey & Pierce, P.L.C.

(57) ABSTRACT

An image reconstruction algorithm system for hazardous source mapping. The algorithm system can be used to automate and optimize the search path of a movable vehicle (such as a UAV), equipped with detection capability. The algorithm allows the vehicle to localize hazardous sources in multiple scenarios effectively. Hazard mapping is formulated as an inverse problem and solved either with a deconvolution or a reconstruction algorithm, according to the problem complexity. The algorithms can use the Maximum (Continued)

a Posteriori (MAP) and the least square regression algorithm, respectively. However, alternative algorithms can be used as set forth herein. The source mapping algorithms are able to provide a quantitative estimation of the hazard source magnitude. A non-negative version of the least square algorithm is used to reconstruct the map at each step of the navigation algorithm of the vehicle. The navigation algorithm correctly located single and multiples simulated hazardous sources.

15 Claims, 20 Drawing Sheets

(51) Int. Cl.
*G01S 5/02* (2010.01)
*G01V 3/17* (2006.01)
*G01V 3/38* (2006.01)

(56) References Cited

U.S. PATENT DOCUMENTS

| | | |
|---|---|---|
| 2004/0051619 A1 | 3/2004 | Bryan |
| 2005/0285598 A1 | 12/2005 | Barringer |
| 2007/0241954 A1 | 10/2007 | Hintz |
| 2020/0249092 A1* | 8/2020 | Podmore ................ G01M 3/38 |

FOREIGN PATENT DOCUMENTS

| | | | |
|---|---|---|---|
| JP | 2020046231 A | * | 3/2020 |
| RU | 2620451 C1 | * | 5/2017 |
| RU | 2748937 C1 | * | 6/2021 |
| RU | 2755604 C1 | * | 9/2021 |

* cited by examiner

RAPID CHARACTERIZATION OF THE SOURCES OF ELECTROMAGNETIC SIGNALS AND ENVIRONMENTAL SUBSTANCES

CROSS-REFERENCE TO RELATED APPLICATIONS

This application is the U.S. National Phase Application under 35 U.S.C. 371 of International Application No. PCT/US2019/057927, filed on Oct. 24, 2019, which claims the benefit of U.S. Provisional Application No. 62/750,298, filed on Oct. 25, 2018. The entire disclosures of the above applications are incorporated herein by reference.

FIELD

The present disclosure relates to the efficient characterization of the sources of ionizing radiation, electromagnetic signals of specific radiofrequencies, and environmental substances (e.g. sources of interest), including, but not limited to, reconstruction of maps and adaptive data collection systems and methodologies to improve mapping of the sources using one or more stationary or movable detectors, or combinations thereof. The present disclosure further relates to effective mitigation of undesirable sources and/or optimization of intentional placements of desirable sources.

BACKGROUND AND SUMMARY

This section provides background information related to the present disclosure which is not necessarily prior art. This section provides a general summary of the disclosure, and is not a comprehensive disclosure of its full scope or all of its features.

Being able to promptly locate and quantify radioactive contaminants, while minimizing the dose to ground personnel, plays a key role in emergency response to nuclear or radiological accidents. A scalable and robust source-mapping algorithm would greatly improve the capability of timely localizing and identifying radiation sources by detectors on movable platforms, e.g. UAVs, trucks, robots, workers, and other movable vehicles or platforms. Similar benefits would accrue for the cases of other environmental contaminants, such as hazardous chemicals. The most significant source of a contaminant or radioactive emissions depends not only upon the presence of multiple sources but on the geography of the resulting hazardous fields. The algorithms may also be applied to help determine mitigation strategies.

The response to malicious interference with WiFi or cellphone delivery through the placement of additional illicit sources would be greatly aided by a means of rapidly and potentially automatically mapping not only the signals themselves as a function of position but also the locations of their sources. Similarly, the effective utilization of electromagnetic signal sources for guiding self-driving vehicles would benefit from a continuously evolving knowledge of the locations of their fixed sources and the resulting signals as a function of position and failures of such sources that may occur with time. The maps could be continuously updated using data gathered from the vehicles moving in the environment. This process would be greatly facilitated by continuous and efficient mapping of not only the signals being used but the sources of such signals. The methods of both mapping and efficiently collecting information about desirable sources according to the present teachings can also be used to determine the optimal location for the placement of new sources to strengthen coverage.

The examples contained herein will primarily focus on ionizing radiation sources and a single mobile detector on an unmanned aerial vehicle (UAV). However, it should be understood that these principles are equally applicable to chemical contaminants, particulates, WiFi routers, cellphone towers, signals used for autonomous vehicles, and the like. Single or multiple moving detectors may be utilized, as may networks of stationary sensors used exclusively or in combination with the moving detectors.

Several measurement systems were designed for similar applications (Vetter 2017; Sinclair 2016b; Torii 2013; Lyons 2012; Musolino 2012). However, a rigorous reconstruction algorithm of the spatial distribution of contaminant source is still lacking. Liu and colleagues (Liu 2015) have recently used a deconvolution algorithm for source distribution reconstruction. However, according to the principles of the present teachings, it is possible to generalize radiation mapping as an inverse problem and analytically solve it as a deconvolution or a reconstruction problem, according to its complexity. After classifying the radiation mapping inverse problem, one can apply a Maximum a Posteriori (MAP) and a least square (LS) solution to solve the convolution and reconstruction problem, respectively. It should also be understood that any estimation method may be used, such as but not limited to minimum mean square error (MMSE), Maximum a posteriori (MAP), recurrent neural network (RNN), long-short term memory (LSTM), or any other type of traditional or artificial intelligence estimation method.

Using the reconstructed source map, one can regenerate a measurement map and use it to modify the original measurement. The iterative application of the reconstruction of an unknown radiation field is the UAV navigation algorithm that we introduce and validate via simulation herein. Moreover, it is shown that the proposed navigation algorithm can be used to find one or multiple lost sources effectively. Principles for how to adjust the search parameters when using the navigation algorithm are further provided herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
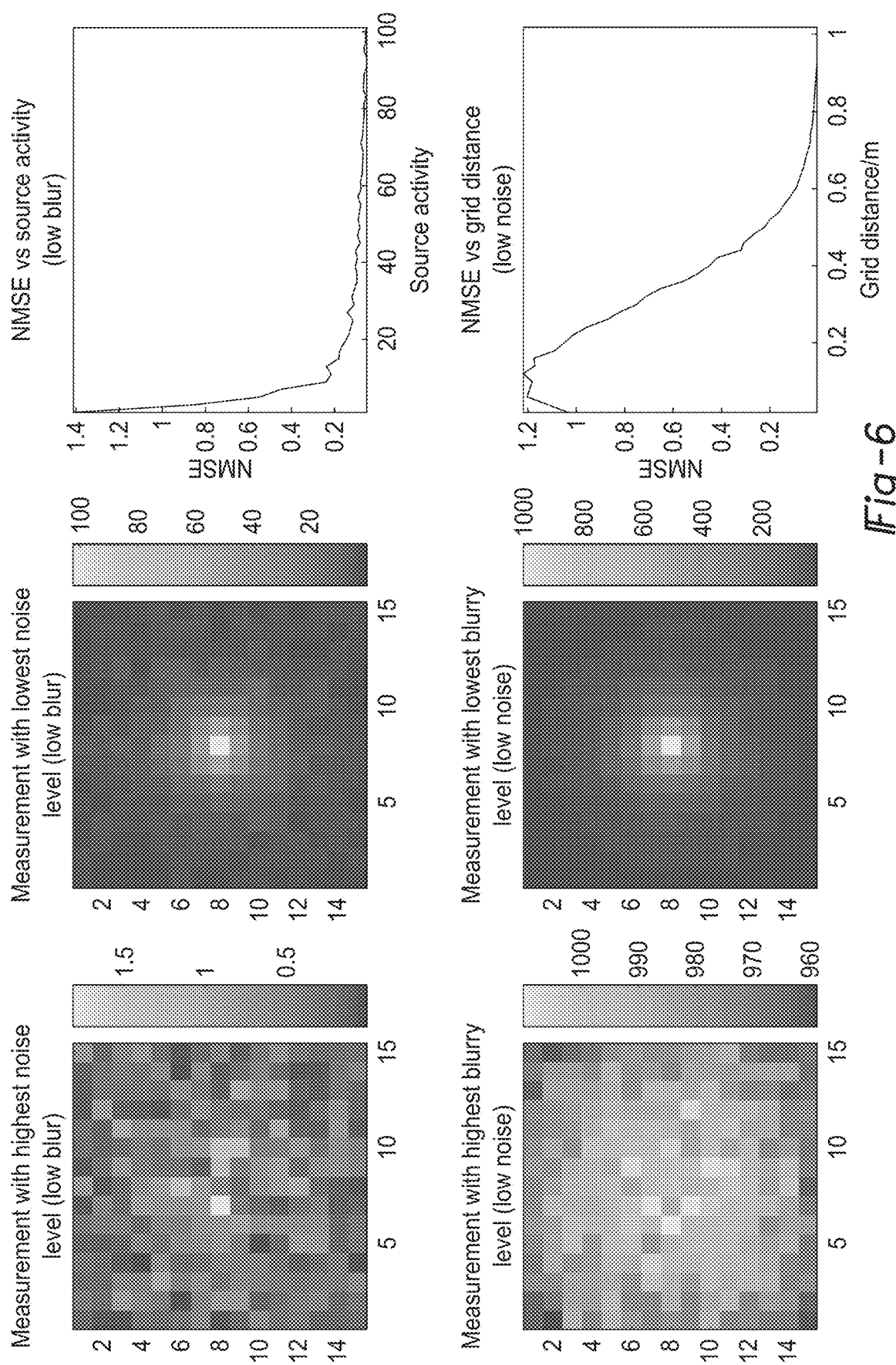

FIG. 6 reported the NMSE between the measured map and the reconstructed map.

Figure 7:
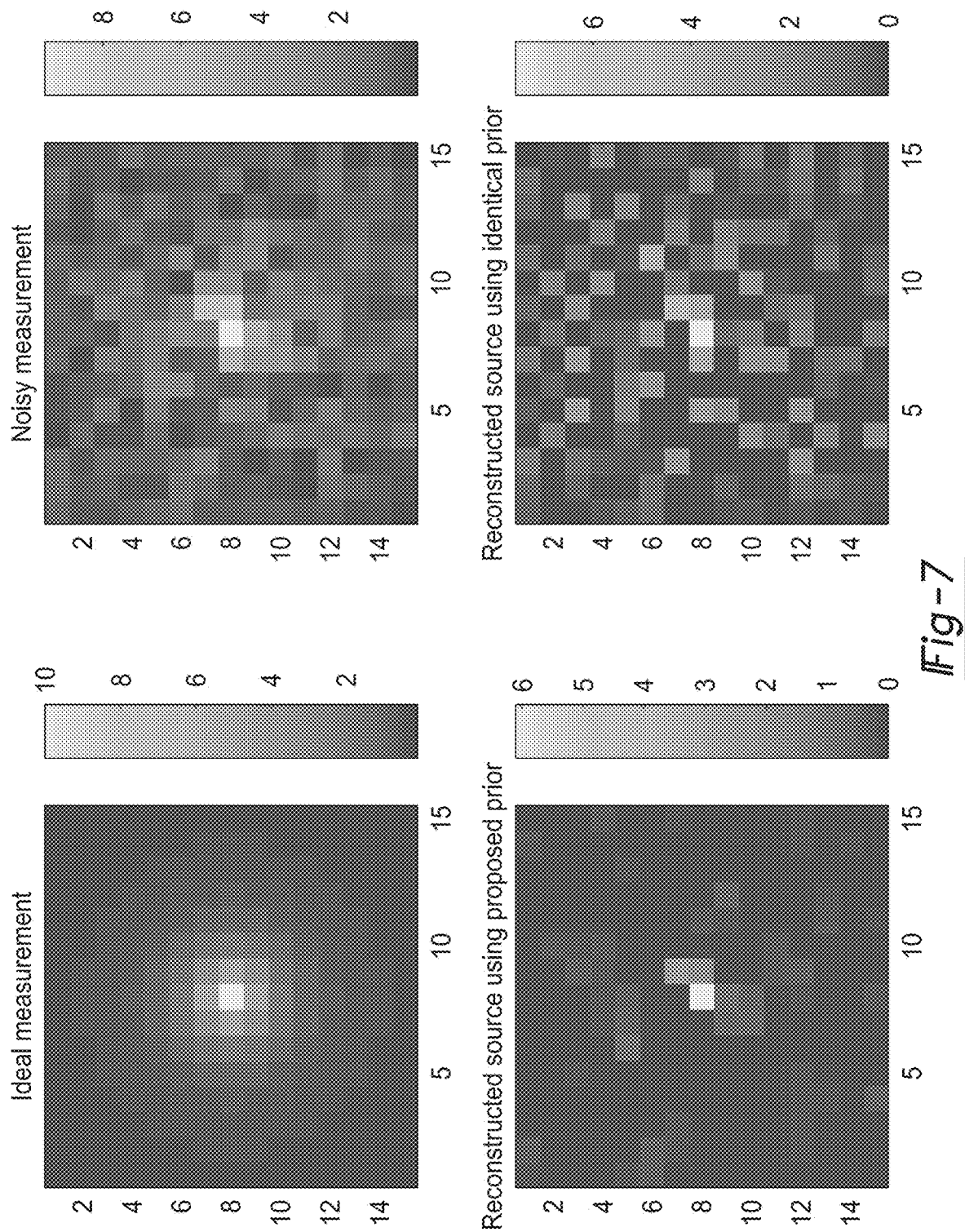

FIG. 7 is an example test case where the noise level is set to be high.

Figure 8:
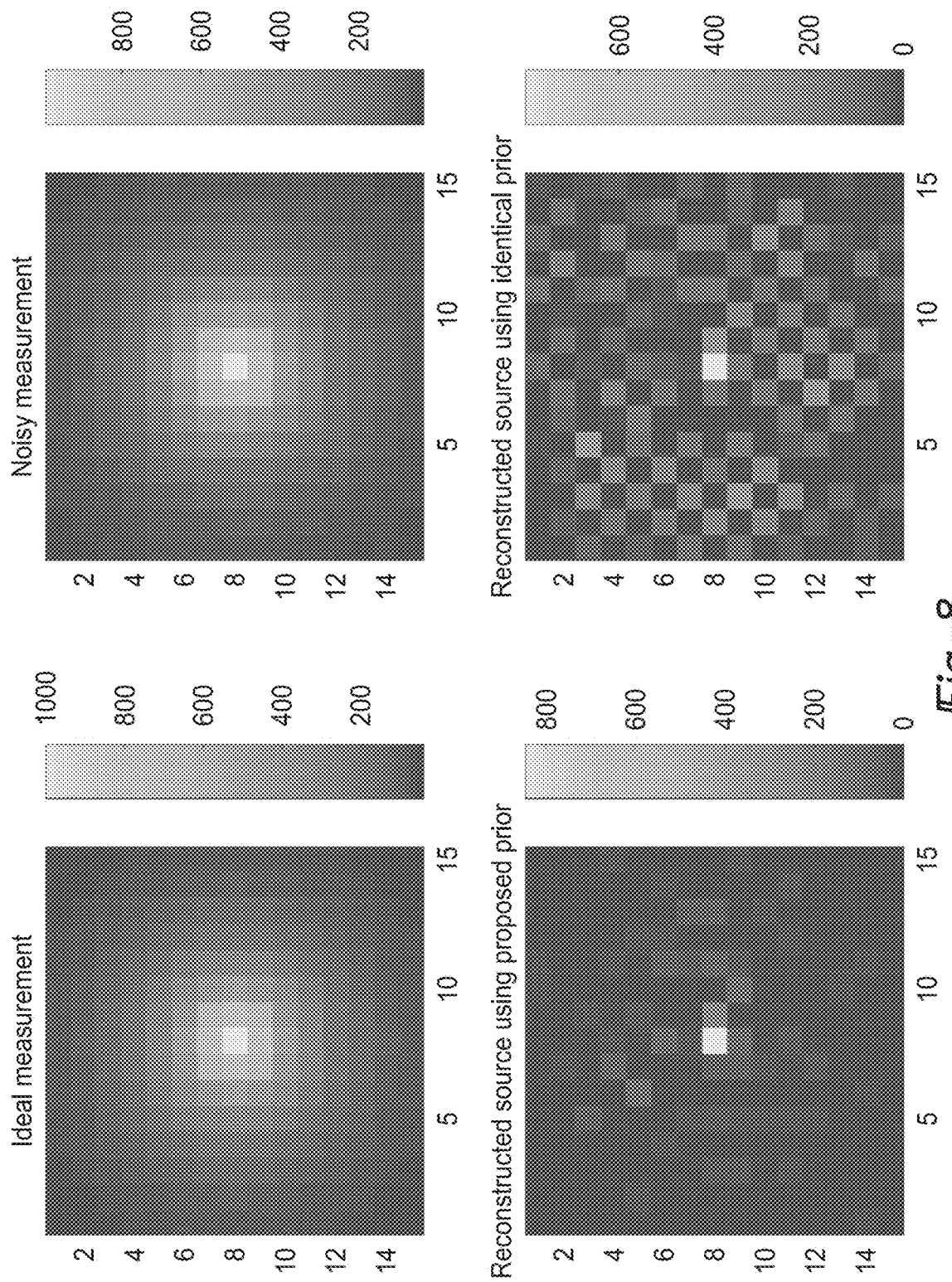

FIG. 8 is an example test case where the blurry level is set to be high.

Figure 9:
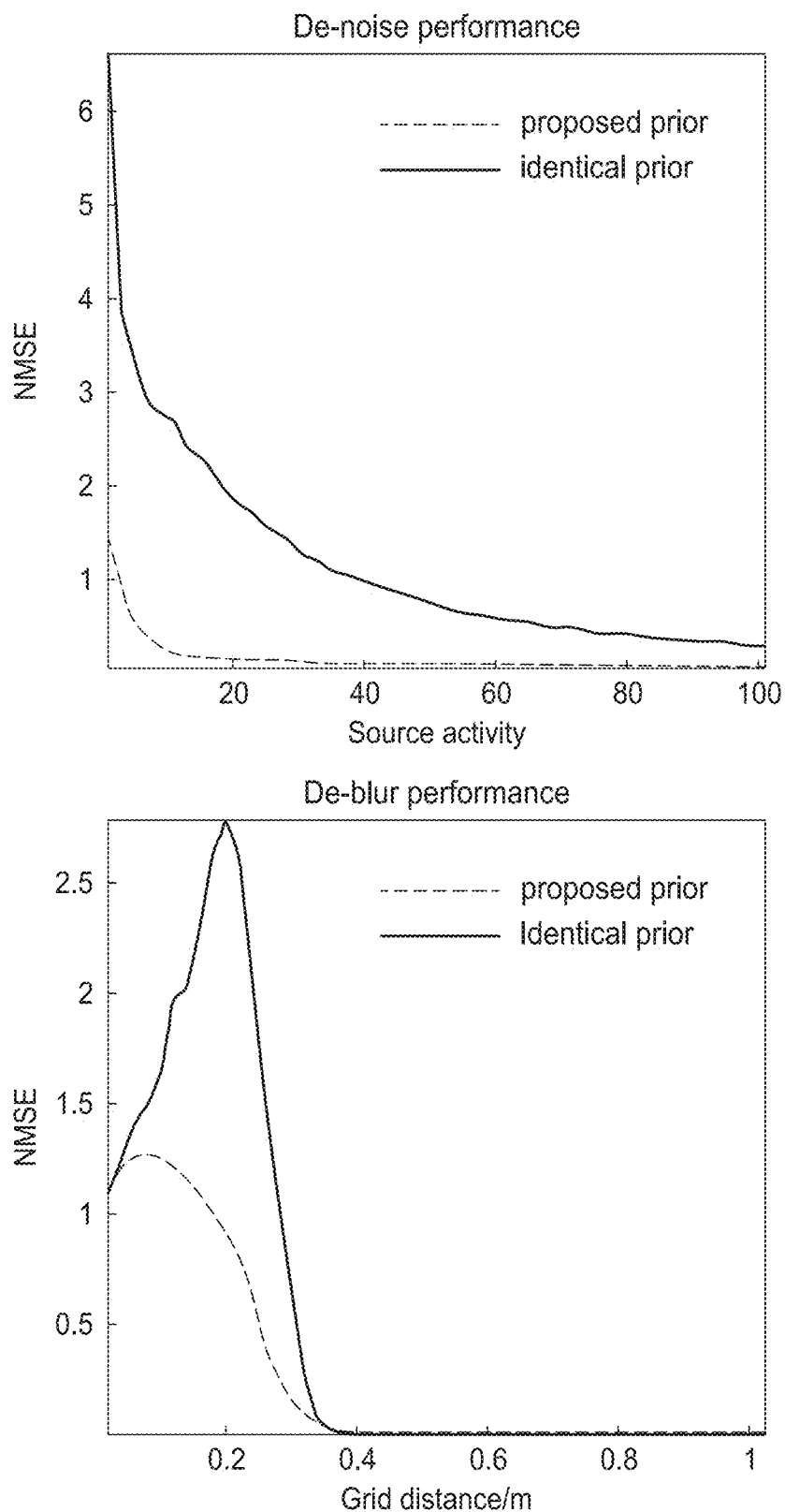

FIG. 9 shows the general NMSE performance.

Figure 10:
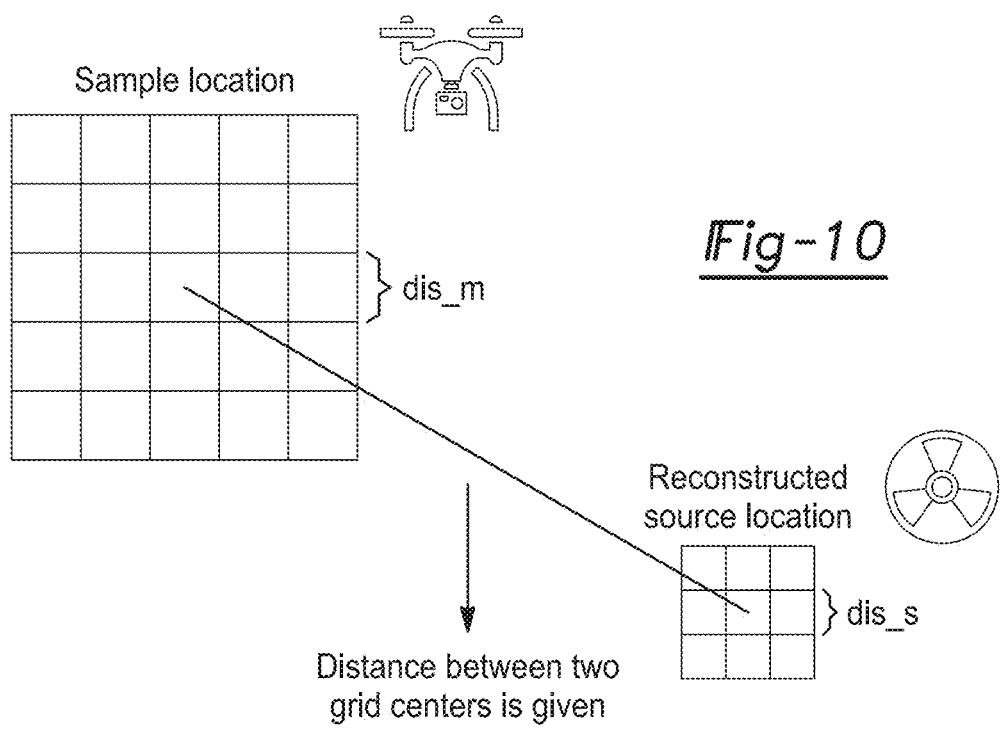

FIG. 10 is a model of the solution for the situation where the map location, pixel distance, and number of pixels are all different.

Figure 11:
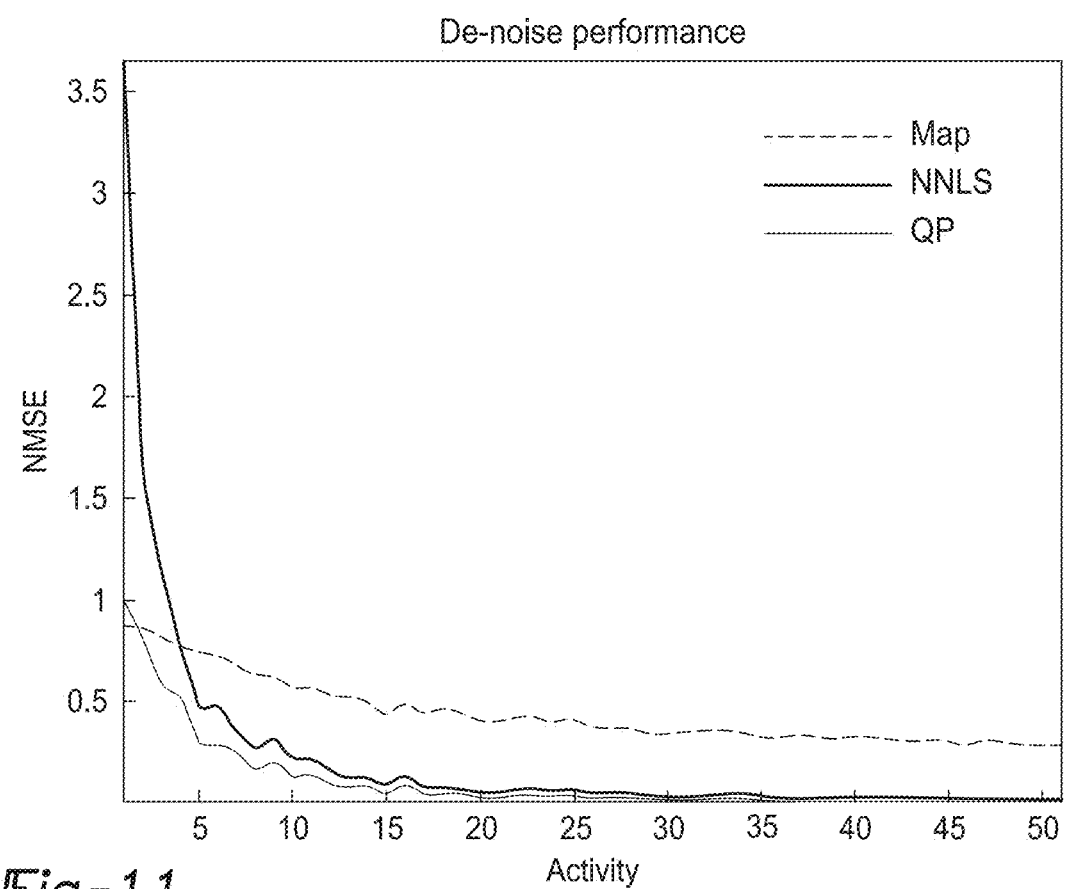

FIG. 11 is the result of a point source reconstruction.

Figure 12:
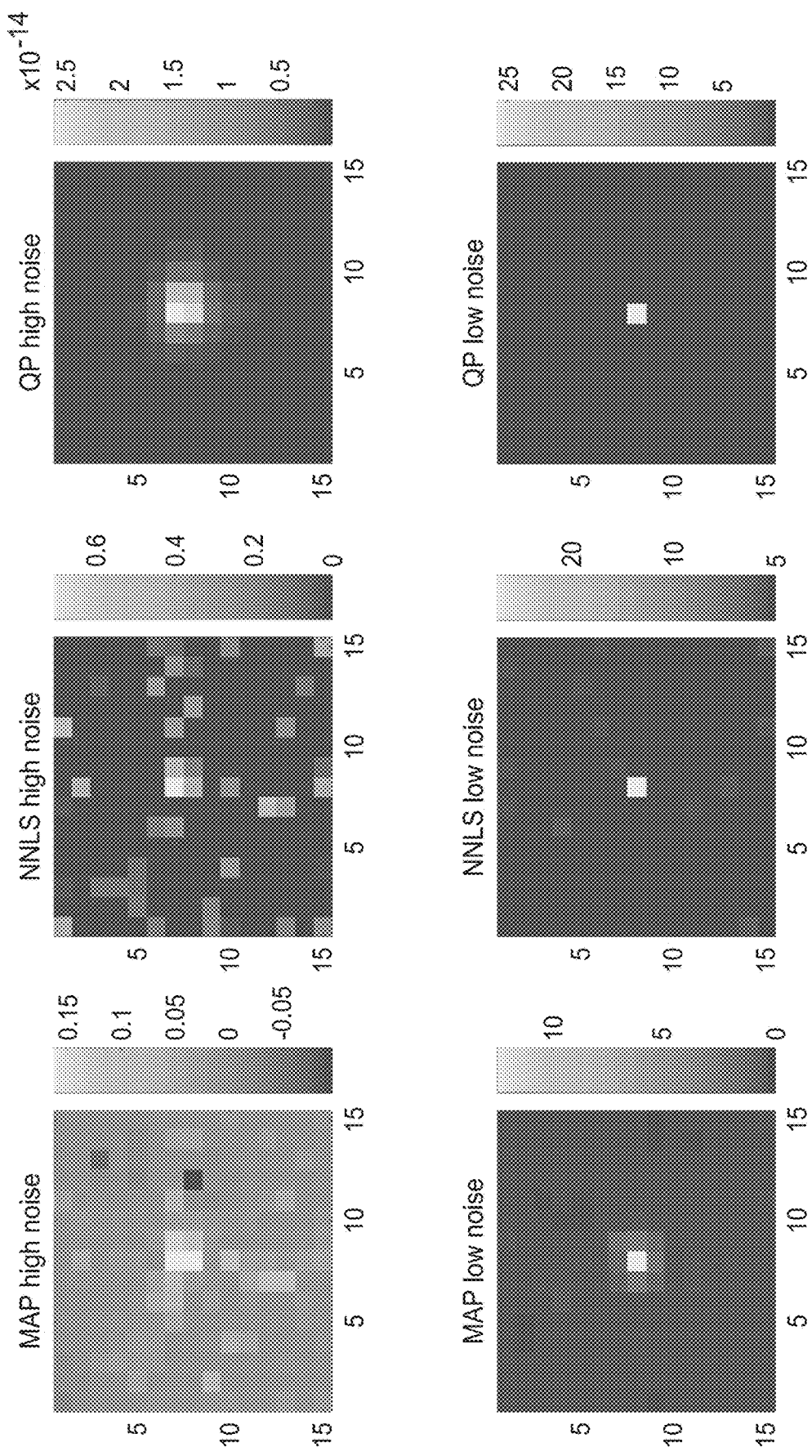

FIG. 12 is the result of a point source reconstruction.

Figure 13:
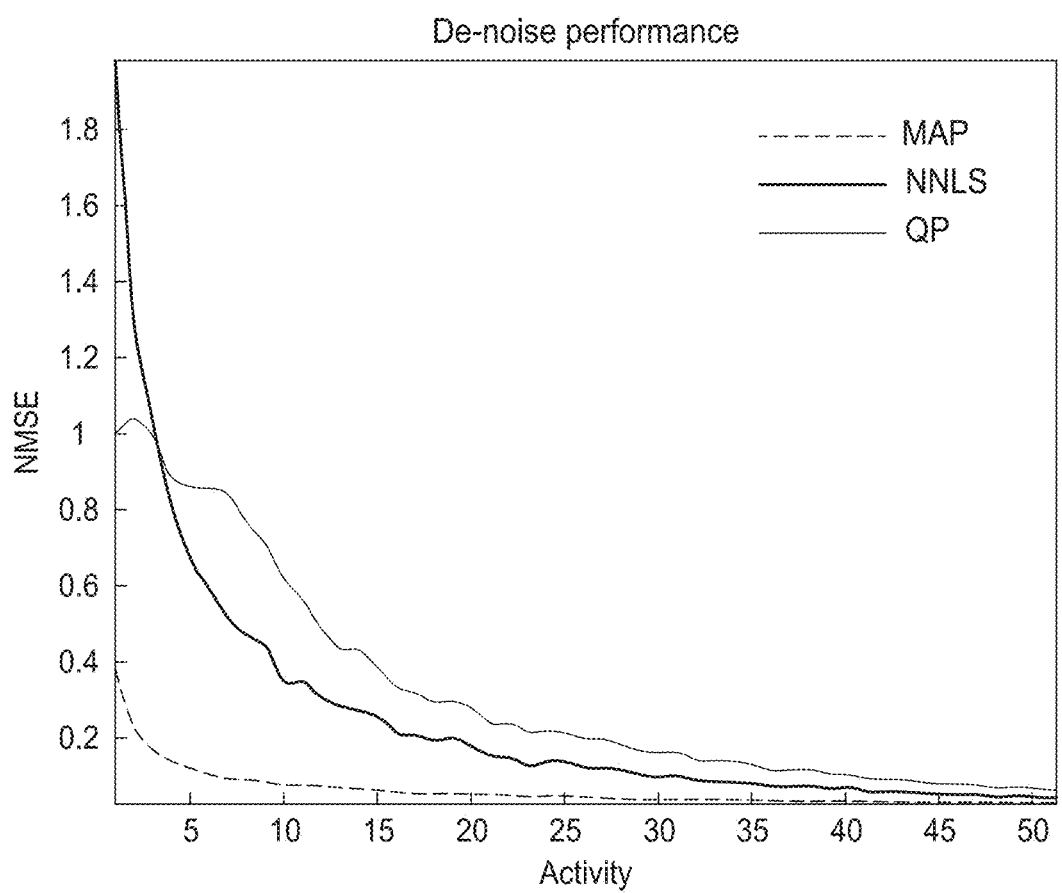

FIG. 13 shows the mapping of a distributed source.

Figure 14:
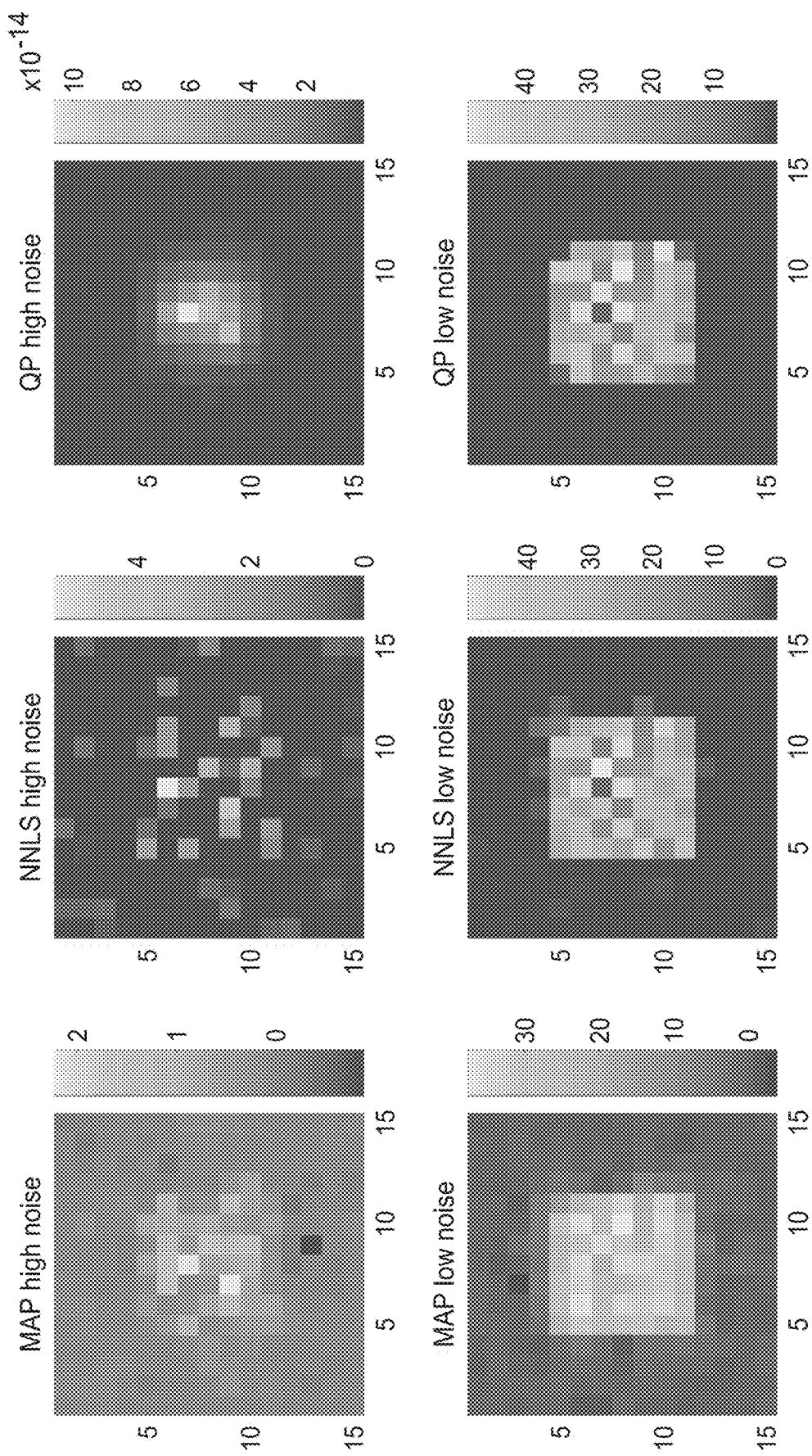

FIG. 14 shows the mapping of a distributed source.

Figure 15:
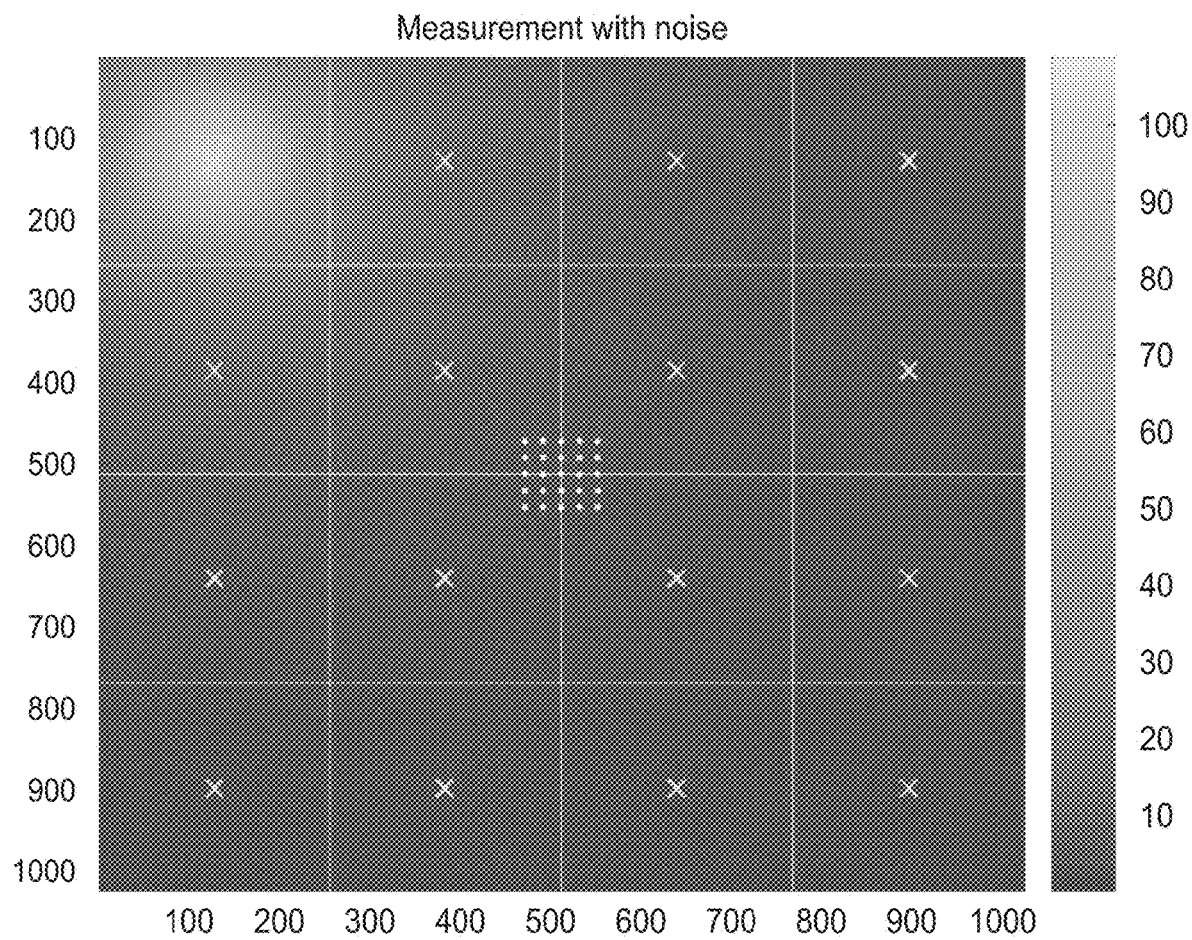

FIG. 15 is an example of a 16 regions test case.

Figure 16:
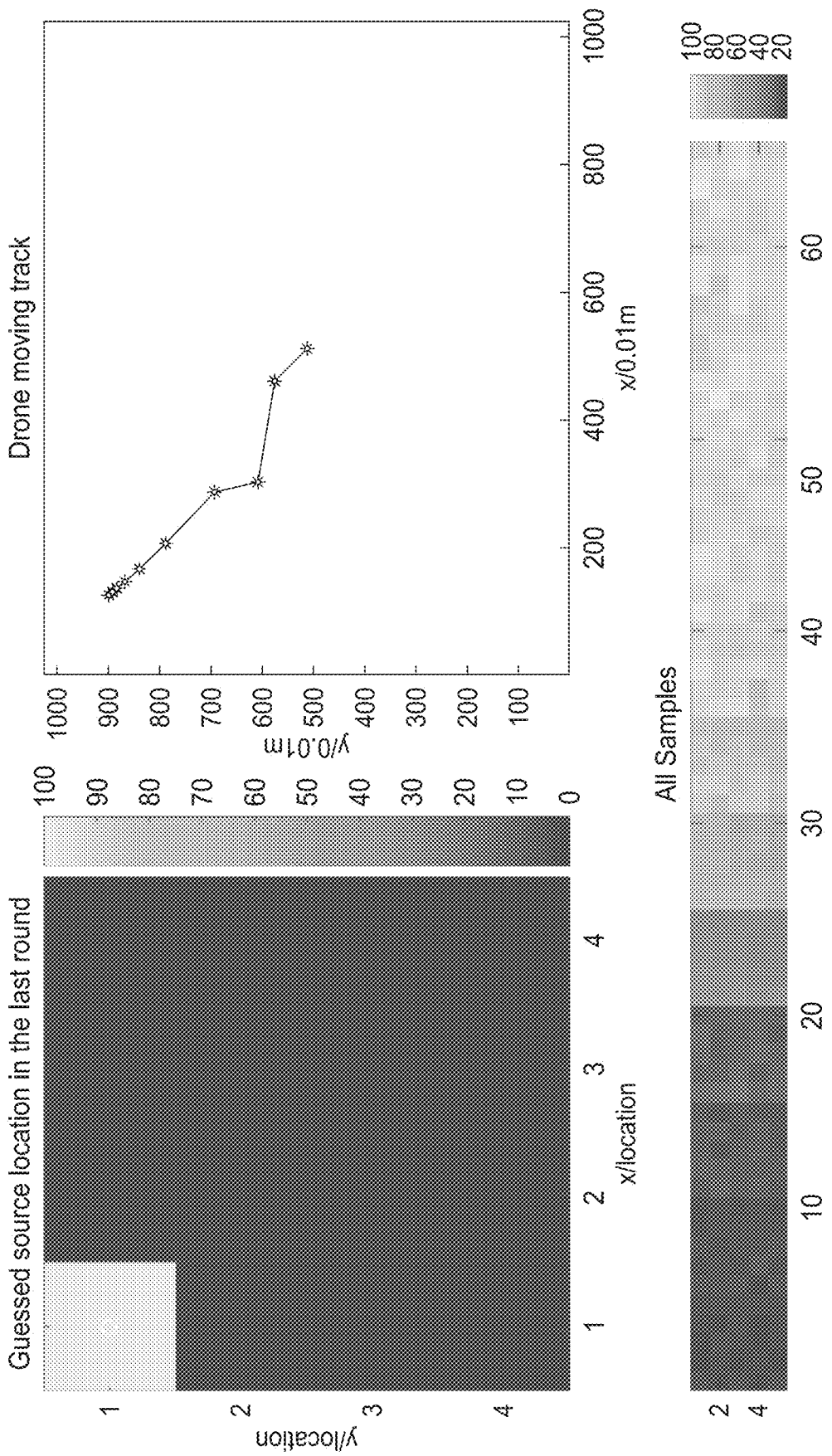

FIG. 16 is the result of a test problem.

Figure 17:
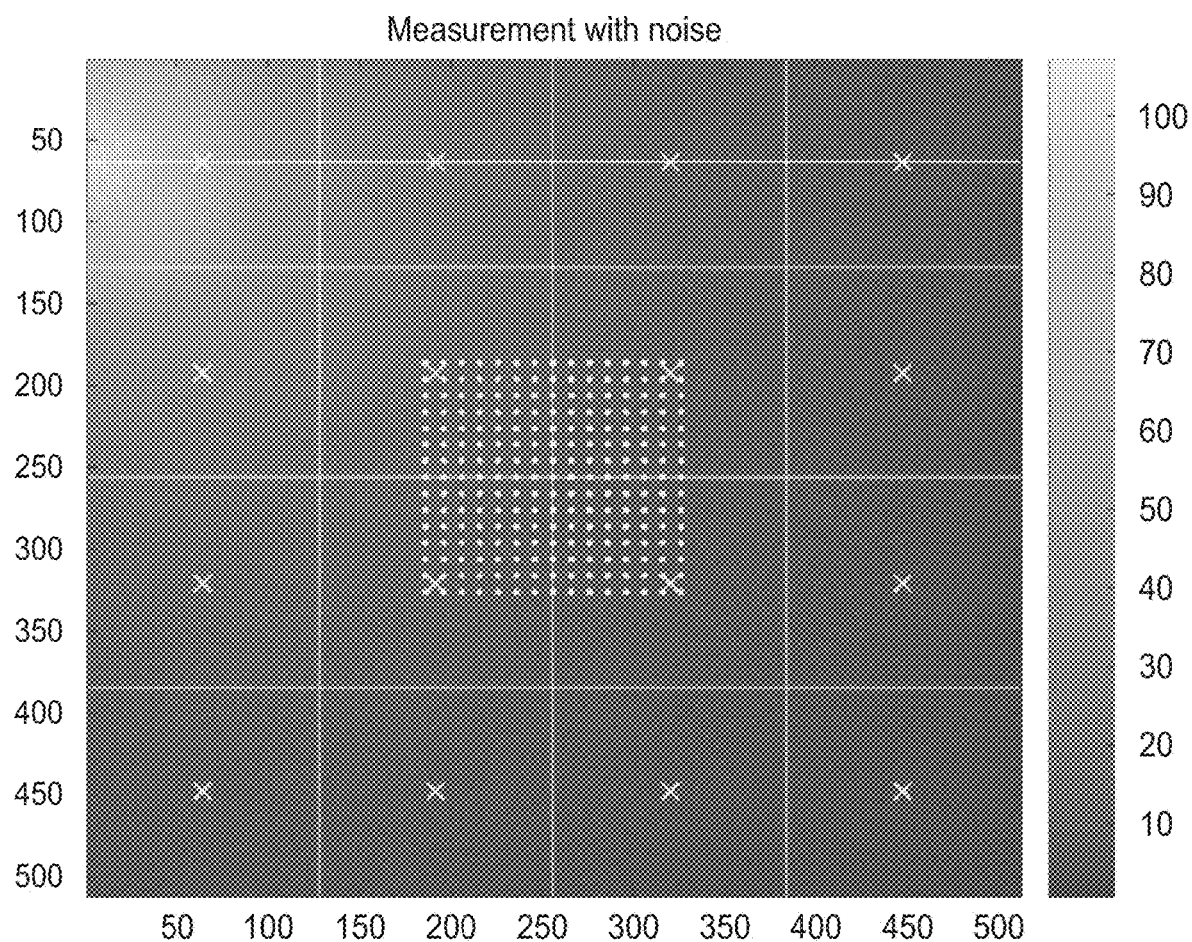

FIG. 17 is an example test case with moving source shown as top Xs connected by lines, and fixed sample location shown in the center.

Figure 18:
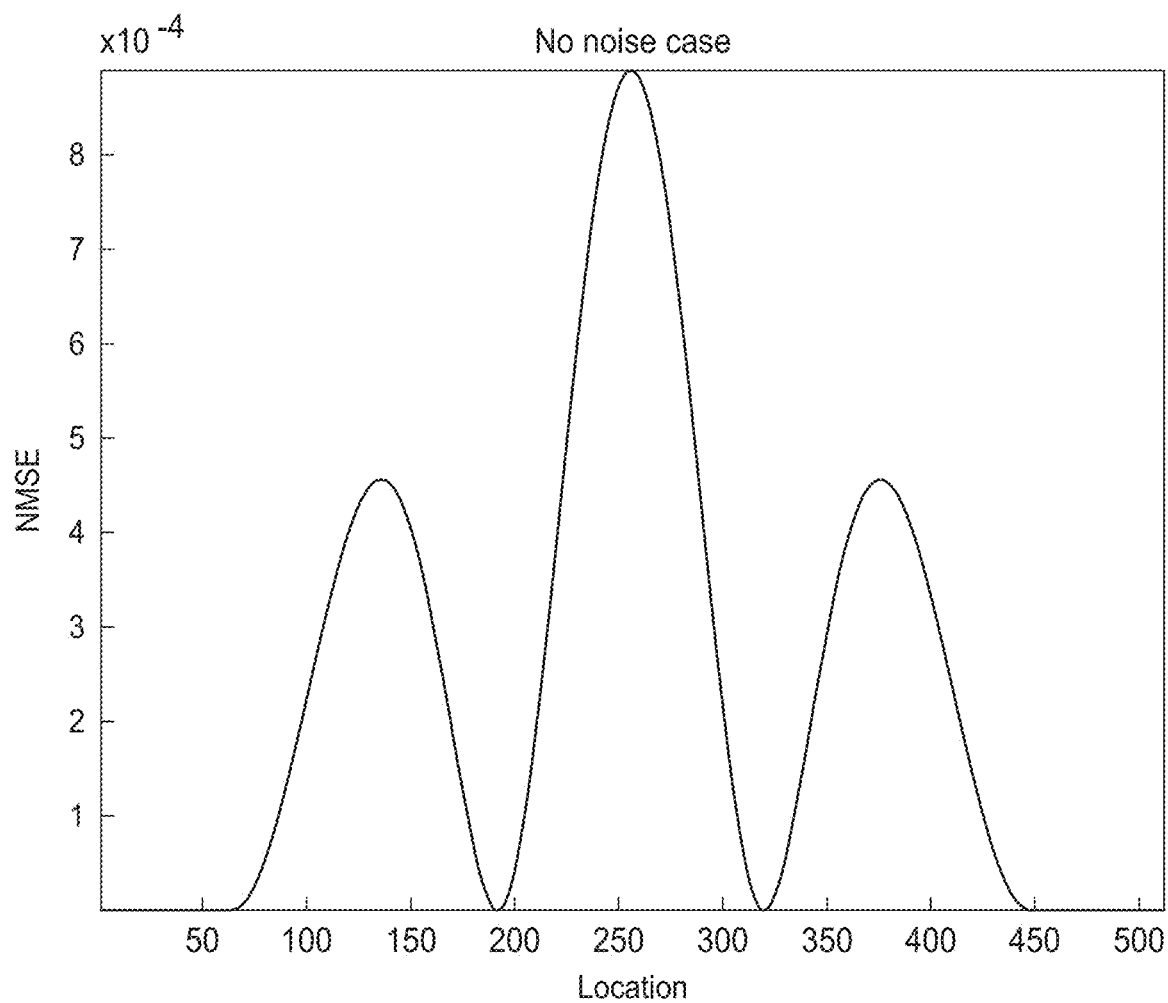

FIG. 18 is the result of source location (left to right) as a function of the measurement error (NMSE).

Figure 19:
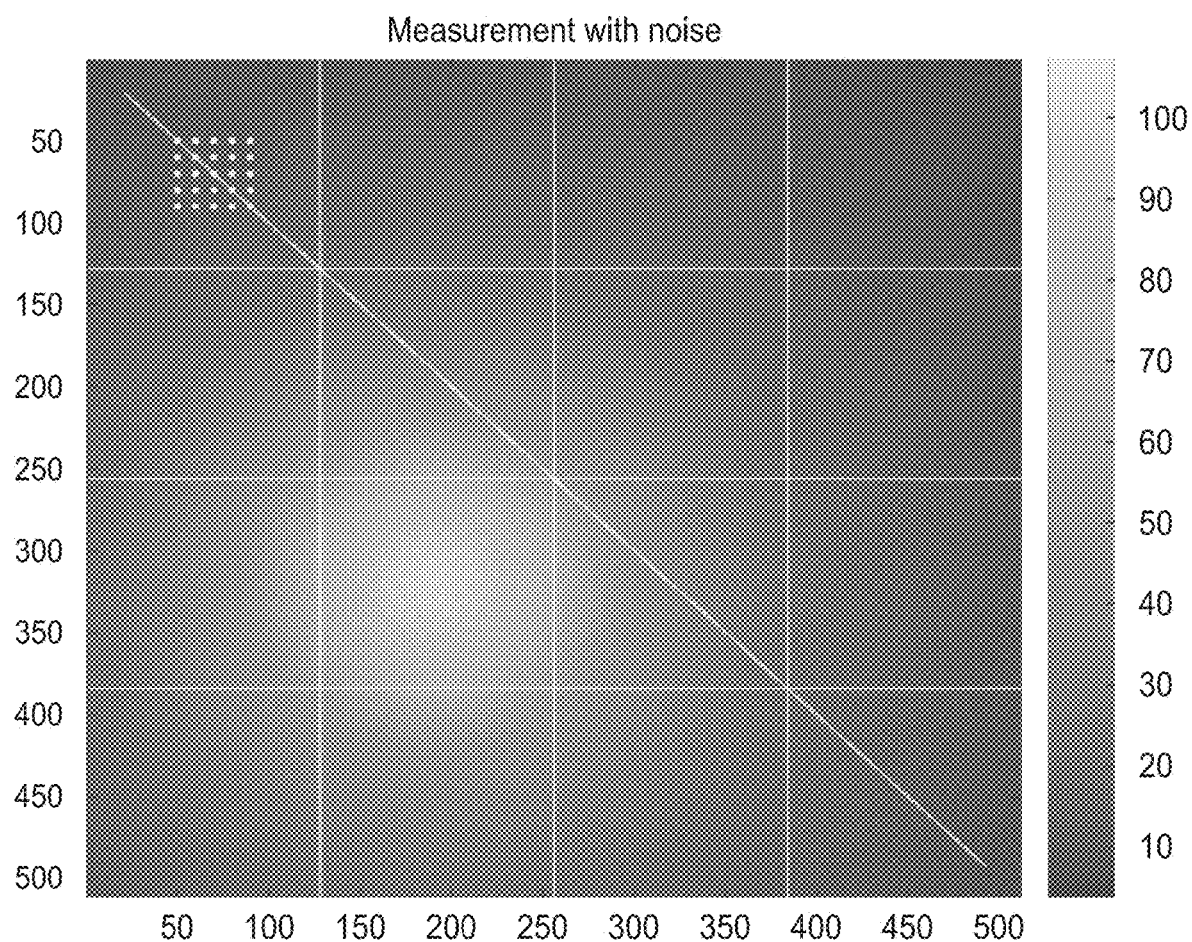

FIG. 19 is an example test case with source fixed in third row from top and second row from the bottom and sampling moved from left top to right bottom along the fixed line.

Figure 20:
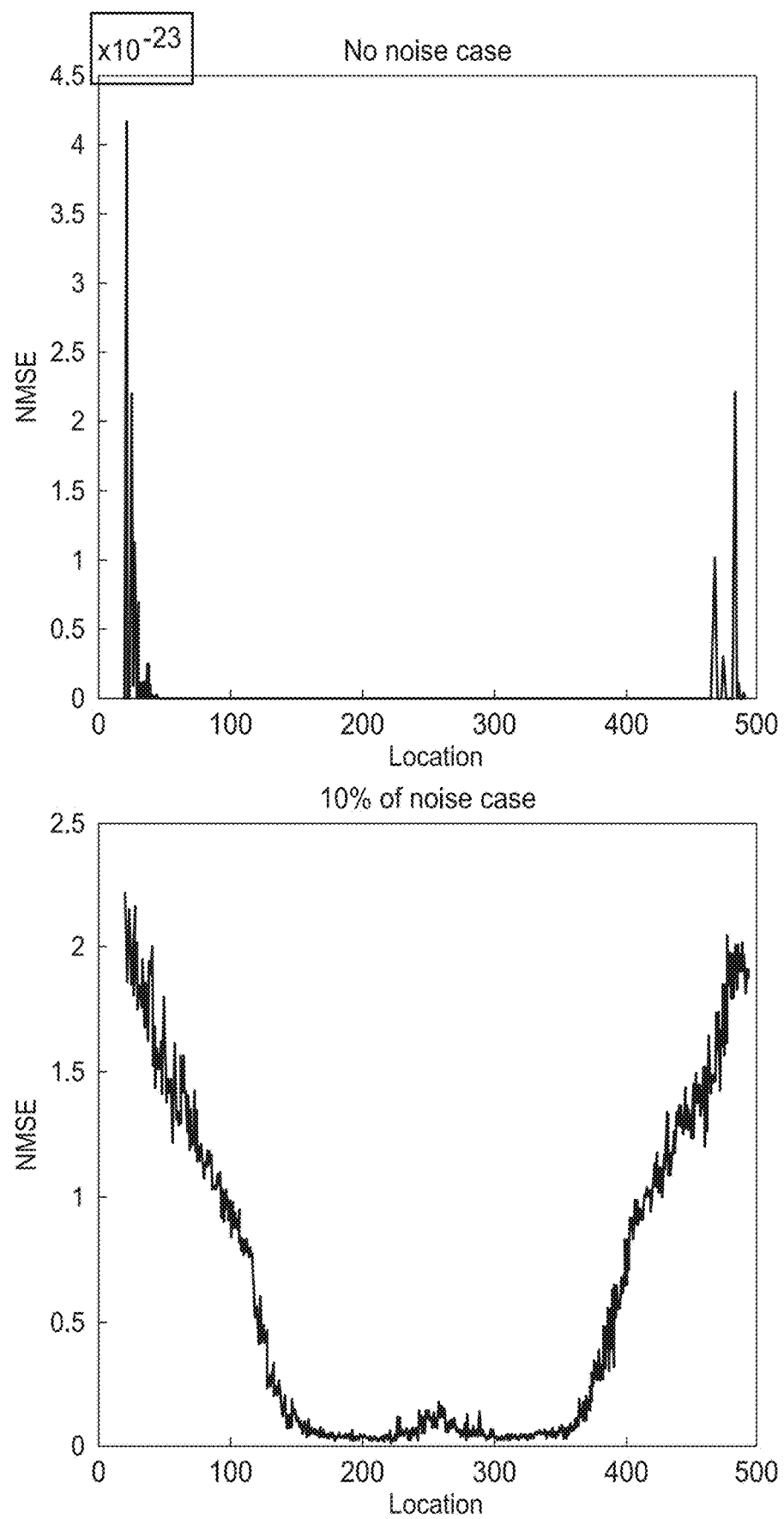

FIG. 20 are graphs of results of algorithm showing performance as a function of location for a no noise case and a 10% noise case.

Figure 21:
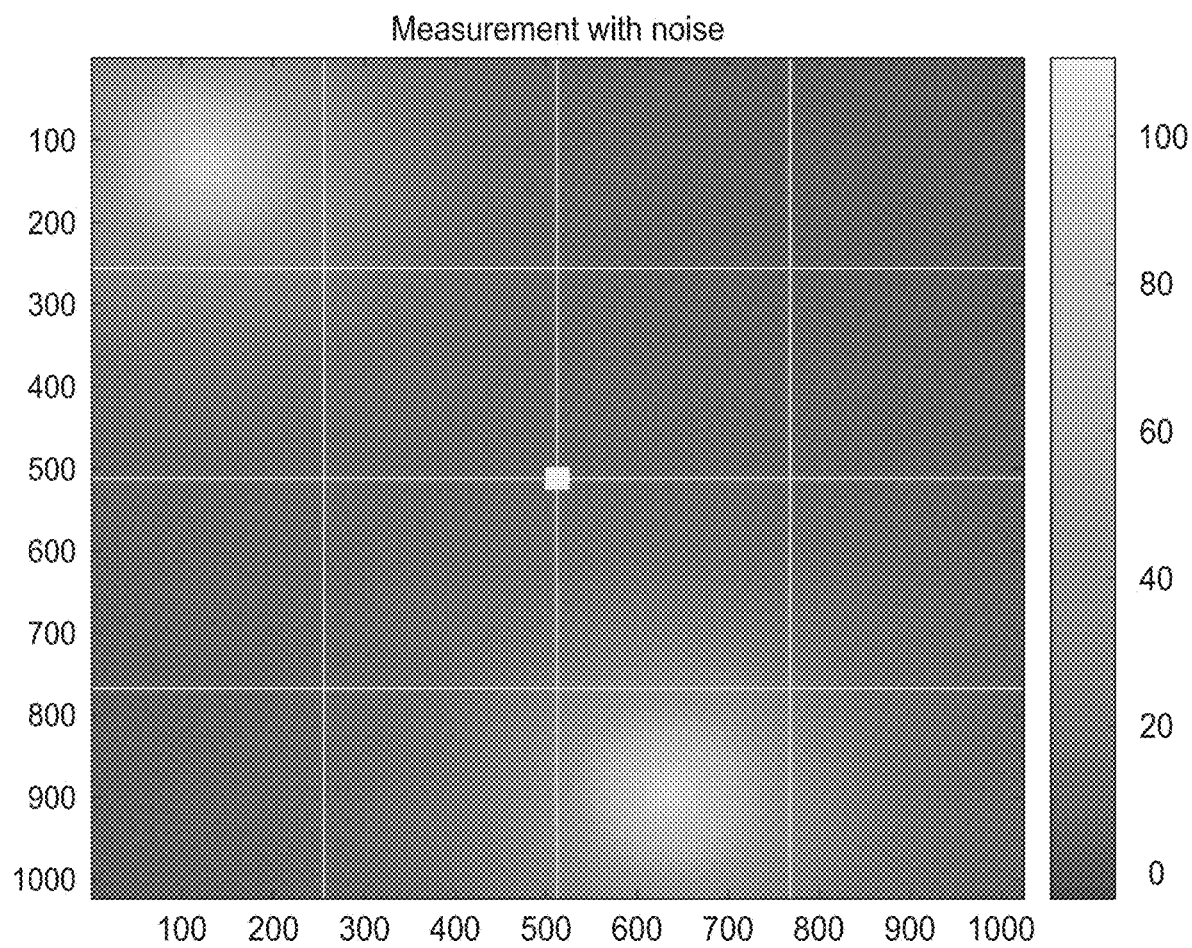

FIG. 21 is an example result for an algorithm.

Figure 22:
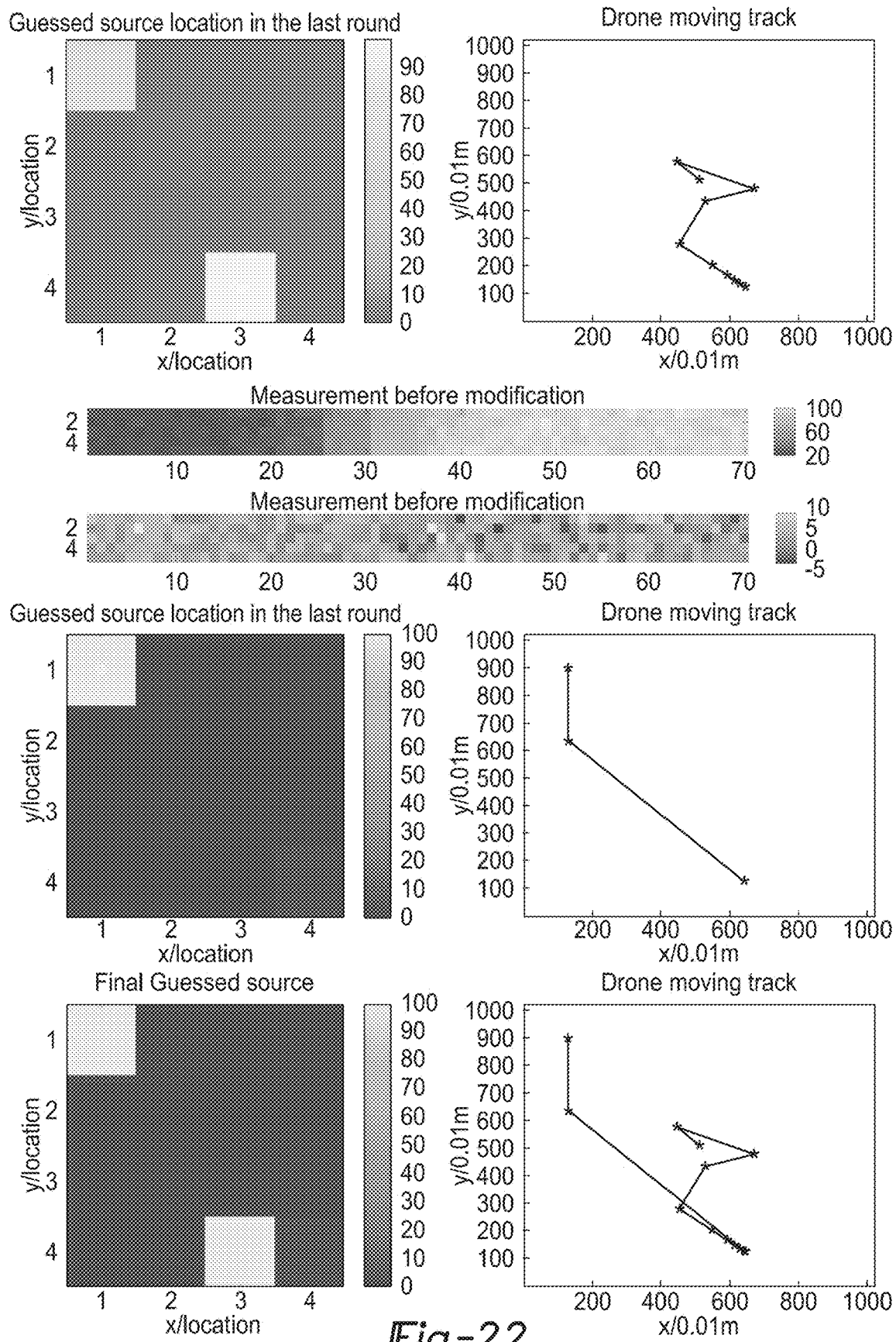

FIG. 22 is a table showing two additional sample patches collected for finding the second source.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

At the outset, we define radiation mapping as an inverse problem, we introduce the simulation framework, and describe the space grid of the original and measured data. All the algorithms described in this and the following sections are implemented in the mathematics parsing software MATLAB® (2016, The MathWorks, Natick, MA). The functions recommended to implement the algorithms are specific to the MATLAB environment, but other software may be used to implement the teaching.

Deconvolution and Reconstruction

Throughout this disclosure, the terms 'deconvolution' and 'reconstruction' will be frequently used. Deconvolution and reconstruction both belong to the class of inverse problems. Solving an inverse problem generally includes recovering unknown information from measured data, which typically result from the convolution of the measurement system response and several sources of noise with the original data. These problems are common to several radiation measurement scenarios, including spectrometry and dosimetry.

In this disclosure, we solve inverse problems to estimate the unknown spatial distribution of a radiation source, by unfolding it from measured data with algorithms typically used for image processing. We solve a deconvolution problem when the measured output is a linear combination of the unknown input with a response function of a system, which is a blurring kernel and depends on the physics of the acquisition process. Conversely, a 'reconstruction' problem needs to be solved when the input and the output are not simply bonded by a linear convolution process.

Comparison Between Image Deconvolution and Source Mapping

In general, the solution of an inverse problem is considered blind when the response of the acquisition chain and the statistics of the noise are unknown. The effect of the acquisition chain can be described by the kernel matrix, which is typically smaller than the original input matrix.

Reconstructing and localizing a radiation source, given the measured map of the radiation field, can sometimes be solved as a traditional non-blind image deconvolution problem, if one knows the system response function.

In this case, the source map can be treated as the latent original image, and the measurement as the blurred image. The blurring kernel can be obtained by solving the following equation for a source of gamma rays:

$$\dot{D} = \frac{\Gamma A}{R^2} \quad (1a)$$

where $\Gamma$ is the specific gamma ray dose constant (R cm$^2$ h$^{-1}$ Ci$^{-1}$), in this disclosure we will refer to a gamma-ray only radiation field, R is the distance between the measurement point and the source (cm), A is the source activity (Ci), $\dot{D}$ is the dose rate (R h$^{-1}$). The equation may be generalized to other electromagnetic emissions where $\Gamma$ would be a normalization constant, A would represent the emission rate of the source or source strength, and $\dot{D}$ would represent the source strength at some distance R from the source.

We rewrite Eq. 1a as 1b, in order to avoid confusion and hold consistency with image processing formalism:

$$M = \frac{\Gamma S}{R^2} \quad (1b)$$

where S (abbreviation for source) represents the A in Eq. 1a, M (abbreviation for measurement) represents $\dot{D}$, while the notation A is reserved to represent a transform matrix used in the following sections. It is important to note that the fundamental dependence of the measurements on inverse of the distance, R, in the above equations is common to other types of emitters and this dependence enables the method as illustrated in this teaching. The relationship includes not only ionizing radiation such as gamma rays and x-rays from radioactive materials, but to the emission of signals from other sources, i.e. other parts of the electromagnetic spectrum of particular frequencies. The methods are thus readily applicable to WiFi signals, cellphone signals, ultrahigh frequency (UHF) radiofrequency signals, for example.

Eq. 1b does represent an approximation of the actual situation for cases that are not "line of sight" between the source and the detector, because material in between the source and the detector may absorb, scatter, reflect, or change the energy or frequency of the signal. For gamma rays and x-rays, the energy of the gamma rays affected by intervening objects is changed in a predictable manner. Scattered gamma rays may be eliminated from consideration, or their existence may be used to determine the presence of the intervening materials. In the case of radiofrequency signals, such interference may be far less significant but reflections may become important. Dealing with these could involve iterative methods hypothesizing and accounting for physical beam alterations incorporated into the algorithms themselves.

Returning to consideration of the method, there are two main differences between the environmental mapping process described in this teaching and the non-blind image deconvolution:

1) The measurement map and the source map will not necessarily share the same system of reference. In those cases, the simple convolution relationship between the source map and the measurement map will not apply.

2) Over sampling is allowed. In fact, one can use more than N×N data points to reconstruct an N×N image.

Definition and Simulation of the Measured Source Map

Measured data are a function of the source strength term (S), the source-to-detector distance (R), and the normalization constant, as described in the previous section (Eq. 1b). The normalization constant is assumed constant and unitary, so that the only two variables through the simulation are the source strength S and the source-to-detector distance R. We also assume that the source-to-detector distance (SDD) varies between 1 m and infinite.

Figure 1:
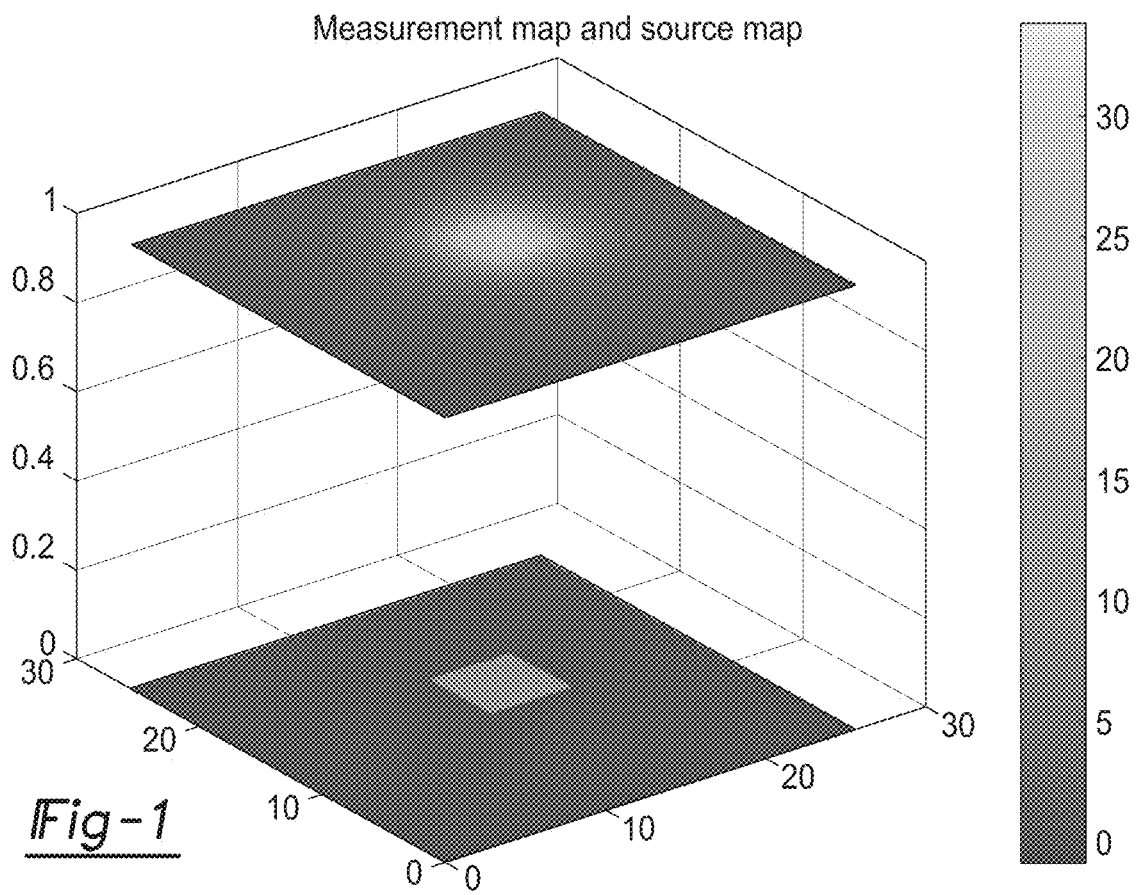
FIG. 1 is a measurement example where the bottom layer is the source layer, the measurement layer is 1 m above the layer.

In addition, the source is assumed as a flat 2D source, with no height (see FIG. 1). In the measurement example of FIG. 1, the bottom layer is the source layer and the measurement layer is 1 m above the source layer. A scaling factor of 1/1000 was used in the measurement map in order to maintain an easy bi-dimensional representation, where the color scale indicates the source intensity.

With the assumption of a minimum SDD of 1 m, equation 2 can be used in the simulation, instead of directly using Eq. 1b, $$M = \frac{S}{R^2 + 1} \quad (2)$$

As we will show in the following sections, the metric chosen to evaluate algorithm performance is the Normalized Mean Squared Error (NMSE) between the reconstructed source map and the original source map. This metric is independent to any constant, so the above assumption will not influence the NMSE.

Noise Definition

Throughout the simulation, noise is added to the ideal radiation field measurement:

$$m_{noisy} = m_{ideal} + n \quad (3)$$

where n is an additive noise. The distribution for n is N(0, $m_{ideal}$), i.e. it has a zero mean, and $\sqrt{(m_{ideal})}$ standard deviation.

In order to avoid non-physical negative measurements, any the negative noise component $m_{(noisy-)}$ is replaced with $m_{(noisy+)} = 2(m_{noisy}\_n) + m_{(noisy-)}$. Under a Gaussian assumption, this replacement will not influence the measurement statistics. Importantly, in this model we do not include any systematic background noise.

Sampling of the Bi-Dimensional Space

In the navigation example, a space sampling function will be introduced, in order to make the simulation closer to reality. In real-world scenarios, the radiation field or measured field map, the sampled measurement data, and the reconstructed source map all have different grid references, which will be given in detail for each reported test case.

In simulation, the measurement grid distance, i.e. the distance between two nearest neighbor points (e.g. sample grid distance 100 mm), is larger than the radiation grid distance (e.g. field grid distance 1 mm). This accounts for the fact that the radiation field is continuous, while our source samples are discrete.

Data Representation and Processing Methods

The relationship between the source map and the measurement map is fully described by Eq. 1b. In order to solve Eq. 1b and find S, we use a standard image processing approach and formulate the inverse problem using either the convolution representation or the matrix representation. Both the convolution and the matrix representation methods will be introduced and discussed in this section. The latter will be used when the problem is more complicated than a non-blind deconvolution. In this section, we also show the conditions for an inverse problem to be solved as a deconvolution.

Deconvolution Problem and General Definitions

Three main factors can affect whether a problem can be solved as a simple deconvolution problem or not: 1) map location, 2) pixel distance, and 3) number of pixels.

The following notation will be used to define these factors:

A capital letter denotes a matrix, e.g. the measurement matrix M.

A small letter with a subscript denotes the element of a matrix, e.g. $m_{ij}$ which represents the element at the i-th row and j-th column in matrix M.

A pair of numbers in brackets denotes the coordinate of the point in the Cartesian coordinate system, e.g. $m_{ij}$ (x,y) marks the location of mu in the Cartesian coordinate system.

With the notation above, define the map location as the coordinate of the center for a map. In particular, the measurement map and the source map share the same location, if:

$$m_{center}(x,y)=s_{center}(x',y')$$

Then, define the pixel distance as the Euclidean distance between each pixel. In particular, the measurement map and the source map share the same pixel distance, if:

$$dis(m_{ij},m_{ij+1})=dis(s_{ij'},s_{i,j+1'})=\Delta y$$

$$dis(m_{ij},m_{i+1j})=dis(s_{ij'},s_{i+1j'})=\Delta x$$

where dis(a,b) is the Euclidean distance point a and b.

Finally, the measurement map and the source map share the same number of pixels if:

$$M,S \in R^{p \times q}$$

The following general notation will also be used:

$[A]^{-1}$ denotes the inverse of the matrix A $[A]'$ denotes the transpose of the matrix A.

Convolution Representation

In image processing, a convolution relationship can be expressed in the following format:

$$M=H**S+N \qquad (4)$$

where ** is the 2D convolution operator, M represents the measurement (or blurred image), S is the source (or latent image), H is the blurring kernel, and N is the noise. Eq. 4 assumes that M and S share the same map location, the same pixel distance, and the same number of pixels.

Figure 2:
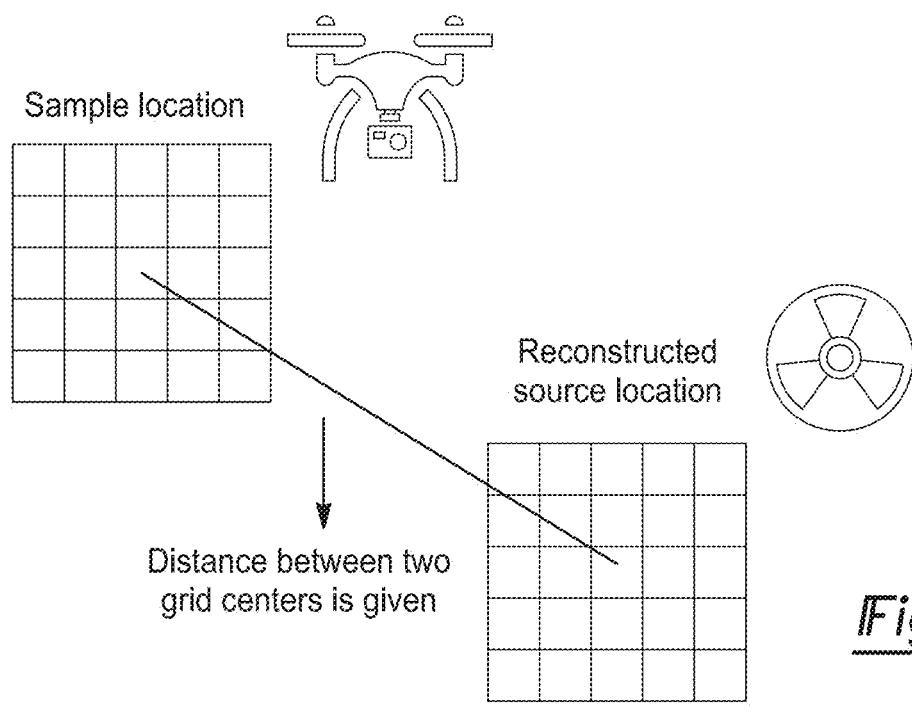
FIG. 2 shows the distance between two grid centers.

In this section, we will show that Eq. 4 still applies even if M is shifted in space with respect to S. This is especially relevant to the radiation search problem because in real-world scenarios the starting sampling point is typically far away from the source's location, as shown in FIG. 2.

We now will show that a space shift between the source and the measurement map does not influence the convolution relationship.

In this proof, we assume $M,S \in R^{(n \times n)}$. Then, since the radiation field created by the source is assumed to extent to the infinite distance, the kernel size must be at least (2n−1)×(2n−1). This condition guarantees full matrix coverage even in the worst-case scenario, i.e. when the source is located at the corner of matrix.

The mathematical convolution operation consists in adding each element of the image matrix to its neighbors, weighted by the kernel. During this process, the convolution kernel is kept uniform, i.e. each input image pixel is multiplied by the same kernel matrix. Thus, to make (4) still valid, one must find a uniform kernel H, i.e. we proof this by showing that the kernel for s_11 is the same for any arbitrary source $s_{pq}$ where p=1, 2, 3 . . . n; q=1, 2, 3 . . . n. For convenience, we refer our proof starting from the corner point of the source map, i.e. $s_{11}$.

For the first source $s_{11}$, H is calculated by the location information $dis(s_{11}, m_{ij})$, i,j=1, 2 . . . n. H is calculated by a function f(R) (NOTE: in this disclosure's simulation example, $f(R)=1/(1+R^2)$, however, one can prove that for any H=f(R), the theory will always hold):

$$h_{(n-1+i)(n-1+j)}=f[dis(s_{11},m_{ij})] \qquad (5)$$

Apparently if i,j are the element index of matrix M, there must have i=1, 2, 3 . . . , n and j=1, 2, 3 . . . , n. But notice that (5) is purely distance dependent, if we have $s_{11}$ located at $s_{11}$ (x,y), and $m_{11}$ located at $m_{11}$ (x',y'), one can define i=−n+1, −n+2 . . . 0, 1 . . . n and j=−n+1, −n+2 . . . 0, 1 . . . n and let $dis(s_{11}, m_{ij})$ be the distance between location $s_{11}$ (x,y) and $m_{ij}$ (x'+iΔx−Δx,y+jΔy−Δy). Then, (5) can be used to calculate the entire new kernel for weight $s_{11}$.

Then, for an arbitrary source $s_{pq}$, its kernel is:

$$h'_{(n-1+i)(n-1+j)}=f[dis(s_{pq}m_{i-1+p\,j-1+p})] \qquad (6)$$

where i=−n+1, −n+2 . . . 0, 1 . . . n and j=−n+1, −n+2 . . . 0, 1 . . . n.

As the pixel distance is assumed to be the same, point $s_{11}$, $s_{pq}$, $m_{ij}$, $m_{i-1+p\,j-1+p}$ will form a parallelogram, thus:

$$dis(s_{11},m_{ij})=dis(s_{pq}m_{i-1+p\,j-1+p}) \qquad (7)$$

Then we get:

$$h_{(n-1+i)(n-1+j)}=h'_{(n-1+i)(n-1+j)} \qquad (8)$$

And the theory is proven.

Figure 3:
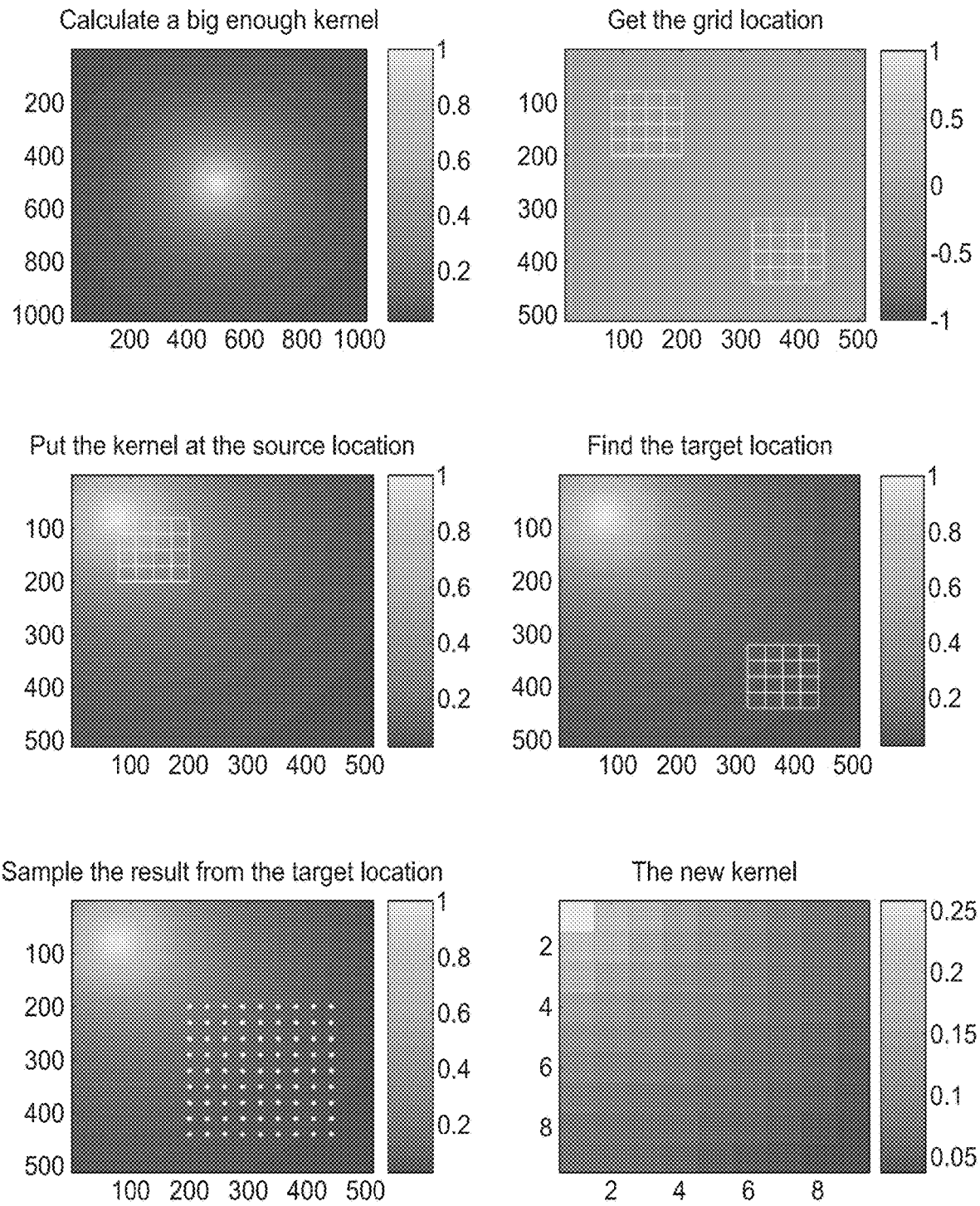
FIG. 3 shows one process on getting the new kernel, showing the relationship between the original kernel and new shifted kernel.

FIG. 3 shows one process on getting the new kernel, it might be a rather slow process, but will show the relationship between the original kernel and the new shifted kernel, thus we present here for intuition. However, even if we have proven the theory, we are still not necessarily recommending the convolution representation. The situation we will be facing later is requiring a different grid size, thus it will no longer be a convolution problem, and we will need another representation form of the problem.

The matrix representation form is given in Eq. 10:

$$y=Ax+b \qquad (10)$$

Compared with (4), one can obtain y by vectorizing M, i.e. stretching matrix M along its column, and connect each column to each other to form a vector y. Then vectorize S as x, N as b in the same way. Finally, calculate the transform matrix A using H. Here, for image deconvolution problem, A is simply the convolution matrix of kernel H, and can be calculated, for example, using 'convmtx2' in the mathematics parsing software MATLAB used in this teaching.

As discussed herein, once the grid is different, the convolution representation can no longer be used. However, with some proper adjustment to transform matrix A, the matrix representation can still be used.

We rewrite Eq. 4 and Eq. 10 as Eq. 11 and 12, respectively $$\begin{bmatrix} m_{11} & \cdots & m_{1n} \\ \vdots & \ddots & \vdots \\ m_{m1} & \cdots & m_{mn} \end{bmatrix} = \begin{bmatrix} h_{11} & \cdots & h_{1n} \\ \vdots & \ddots & \vdots \\ h_{m1} & \cdots & h_{mn} \end{bmatrix} ** \begin{bmatrix} s_{11} & \cdots & s_{1n} \\ \vdots & \ddots & \vdots \\ s_{m1} & \cdots & s_{mn} \end{bmatrix} + \begin{bmatrix} n_{11} & \cdots & n_{1n} \\ \vdots & \ddots & \vdots \\ n_{m1} & \cdots & n_{mn} \end{bmatrix} \quad (11)$$

$$\begin{bmatrix} m_{11} \\ \vdots \\ m_{m1} \\ m_{12} \\ \vdots \\ m_{m2} \\ \vdots \\ m_{mn} \end{bmatrix} = \begin{bmatrix} a_{11} & \cdots & a_{1m} & a_{1(m+1)} & \cdots & a_{1(2m)} & \cdots & a_{1(nm)} \\ \vdots & \ddots & \vdots & \vdots & \ddots & \vdots & \ddots & \vdots \\ a_{n1} & \cdots & a_{nm} & a_{n(m+1)} & \cdots & a_{n(2m)} & \cdots & a_{n(nm)} \\ a_{(n+1)1} & \cdots & a_{(n+1)m} & a_{(n+1)(m+1)} & \cdots & a_{(n+1)(2m)} & \cdots & a_{(n+1)(nm)} \\ \vdots & \ddots & \vdots & \vdots & \ddots & \vdots & \ddots & \vdots \\ a_{(2n)1} & \cdots & a_{(2n)m} & a_{(2n)(m+1)} & \cdots & a_{(2n)(2m)} & \cdots & a_{(2n)(nm)} \\ \vdots & \ddots & \vdots & \vdots & \ddots & \vdots & \ddots & \vdots \\ a_{(mn)1} & \cdots & a_{(mn)m} & a_{(mn)(m+1)} & \cdots & a_{(mn)(2m)} & \cdots & a_{(mn)(nm)} \end{bmatrix} * \begin{bmatrix} s_{11} \\ \vdots \\ s_{m1} \\ s_{12} \\ \vdots \\ s_{m2} \\ \vdots \\ s_{mn} \end{bmatrix} + \begin{bmatrix} n_{11} \\ \vdots \\ n_{m1} \\ n_{12} \\ \vdots \\ n_{m2} \\ \vdots \\ n_{mn} \end{bmatrix} \quad (12)$$

By comparing eq 11 to eq 12, the relationship between the convolution representation and matrix representation becomes clear. Eq (11) equals (12), if the convolution relationship holds (see above).
Note in (12), we have:

$$m_{11} = [a_{11} \cdots a_{1m} a_{1(m+1)} \cdots a_{1(2m)} \cdots a_{1(nm)}] * [s_{11} \cdots s_{m1} s_{12} \cdots s_{m2} \cdots s_{mn}]' \quad (13)$$

The intuitive explanation for (13) is the sum of every radiation or signal field generated by every source at the location where we get measurement $m_{11}$. Thus, transform matrix A is actually representing the influence of each radiation source at each location on the measurement map.

Since the distance between two grid centers is given, and according to (2), one could firstly get the axis for each component in measurement map and the source map, then calculate matrix A, using for example, the MATLAB function 'pdist2'. This is valid even if the two maps are no longer have the convolution relationship.

Solution of the Inverse Problems

After explaining the representation method above, the solutions to each problem will be given accordingly. To hold consistence, the same factors used to describe the problems above will also be used herein, i.e. the problem will be described using the following factors: 1) map location, 2) pixel distance, and 3) number of pixels.

Deconvolution Method and MAP Solution

In this section, we will solve the deconvolution problem using the Maximum a Posteriori (MAP) algorithm based on the convolution representation, where the source and the measurement maps share the same location, the same pixel distance, and the same number of pixels. However, it should be understood that any estimation method may be used, such as but not limited to minimum mean square error (MMSE), Maximum a posteriori (MAP), recurrent neural network (RNN), long-short term memory (LSTM), or any other type of traditional or artificial intelligence estimation method.

Hence, one can get the convolution kernel H in this situation using eq 2

$$H = \frac{1}{1 + R^2} \quad (14)$$

Figure 4:
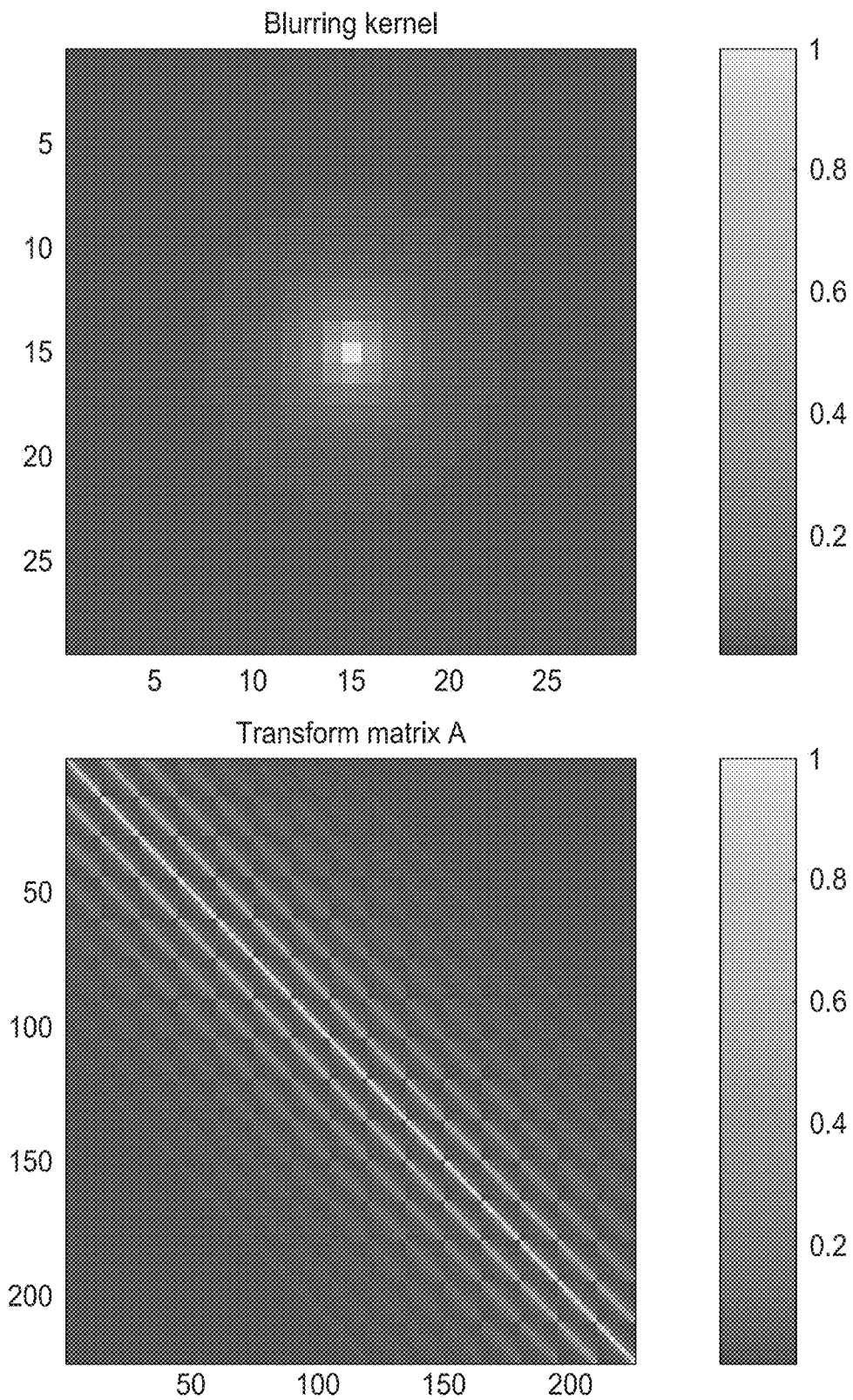
FIG. 4 shows the kernel and the corresponding transform matrix.

In 2-D Cartesian coordinates, $R^2 = x^2 + y_2$, i.e. the kernel and the corresponding transform matrix A looks like FIG. 4.

After getting the transform matrix, one can plug this into the MAP solution, where if we have:

$$m = As + n \text{ where } A \in R^{mn \times mn}, m \in R^{mn \times 1}, s \in R^{mn \times 1}, n \in R^{mn \times 1}$$

$$n \sim N(0, K_n)$$

$$s \sim N(\mu_s, K_s)$$

then we can get:

$$\hat{s}_{MAP} = \mu_s + [A'K_n^{-1}A + K_s^{-1}]^{-1} A'K_n^{-1}(m - A\mu_s) \quad (15)$$

where $N(\mu, K)$ denotes the normal distribution and its parameters, $\hat{s}_{MAP}$ is the estimated answer of the source map, A is the transform matrix, m is the vectorized noisy measurement.

As the noise distribution is already given (section 2.4), the remaining unknown in Eq. 15 is the distribution of the source. This distribution is called the prior knowledge for MAP estimation. One must give a reasonable guess for this distribution before using the MAP.

One Proposed Prior and Associated Result

As indicated above, one must choose a prior distribution before calculating the MAP result. In practice, when choosing this prior knowledge, there actually will be a tradeoff between the de-noise level and de-blur level. In this part, we propose a reasonable way of choosing the prior knowledge based on the measurement obtained. Since this is a fixed criterion, one can fail this method by adding either too much noise, or too much blurry.

The proposed prior is:

$$\begin{cases} \mu_2 = 0 \\ K_s = \text{diag}\left[\left(\frac{1}{2}m\right)^2\right] \end{cases} \quad (16)$$

where m is the vectorized measurement vector, diag(v) is a square matrix with the elements of vector v.

The reason for assuming this prior is that ideally (i.e. with no noise) the source's strength (e.g. magnitude) can never be higher than the measurement rate (Eq. 2). Thus, by the 68-95-99.7 rule, in (16), the probability for the reconstructed source value at a sample point with measurement m, goes beyond m, is less than 5%, since the mean is set to be zero (NOTE: 0.5 m can be directly used as the variance for the source because all constants in this disclosure's simulation is 1).

Figure 5:
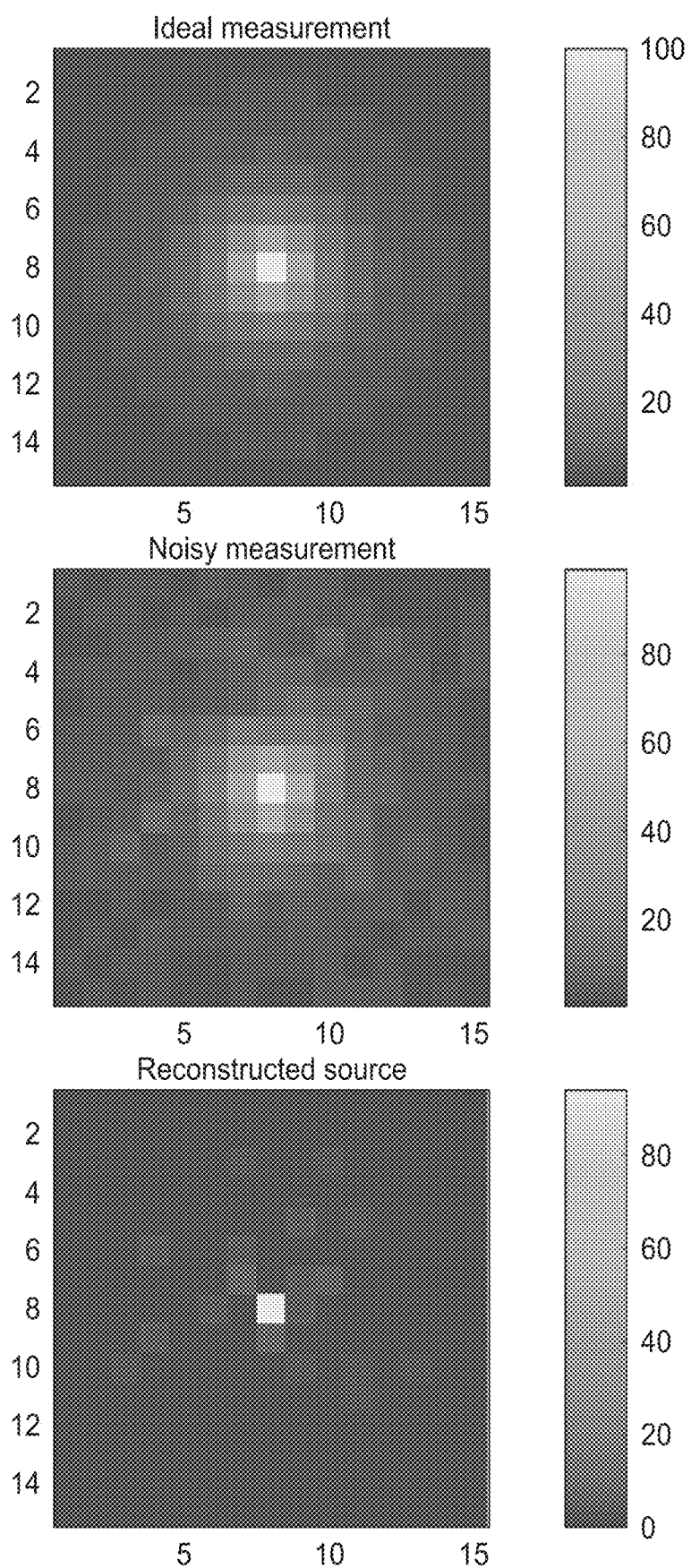
FIG. 5 is an example for a single source deconvolution problem using prior assumptions.

We report an example for a single source deconvolution problem using these prior assumptions in FIG. 5.

As introduced above, for this fixed rule for prior knowledge, the method can fail by increasing either the noise level or the blurry level. This means it will be hard to achieve a good spatial resolution and discriminate between a point source, if the original source's strength is too weak, and several sources close to each other. This performance is shown in FIG. 6. FIG. 6 also reports the NMSE between the measured map and the reconstructed map is defined in a standard way.

Noise Sensitivity of the MAP Method

Once the source map and the measurement map are differently located as it is in FIG. 2, the above prior will no longer hold. The un-sampled location's source strength, or activity in the case of a radioactive source, will be unpredictable. In this situation, it is only reasonable to guess an identical distribution for all un-sampled locations. However, even under an identical distribution assumption, the exact variance value will still be hard to guess.

Besides, an identical distribution assumption will bring worse reconstruction result even if the two maps are overlapping. This is shown in FIGS. 7-9. FIGS. 7 and 8 each demonstrate an example test case, where in FIG. 7, the noise level is set to be high, and in FIG. 8, the blurry level is set to be high. The general NMSE performance is shown in FIG. 9. The variance for the identical prior is set to be equal to the maximum measurement. With this setting, one can see that the identical prior's result is worse in both cases.

Thus, it is only suggested to use the MAP when it has same map location, same pixel distance, and same number of pixels.

Reconstruction Method and Least Square Solutions

In this section, the solution for the situation where the map location, pixel distance, and number of pixels are all different is provided. This model is schematically represented in FIG. 10. However, it should again be understood that any estimation method may be used, such as but not limited to minimum mean square error (MMSE), Maximum a posteriori (MAP), recurrent neural network (RNN), long-short term memory (LSTM), or any other type of traditional or artificial intelligence estimation method.

In the model described in FIG. 10, the convolution representation will no longer hold. However, using Eq. 13, and the associated intuition for the transform matrix, one can still get A with the following entries:

$$a_{(i+mj-m)(k+pl-p)} = \frac{1}{1+dist(m_{ij}, s_{kl})^2} \quad (17)$$

where $A \in R^{mn \times pq}$, $M \in R^{m \times n}$ and $S \in R^{9 \times q}$, dis(a, b) is Euclidean distance between point a and b.

After getting the matrix A, the source map can be reconstructed using the following least square objective equation:

$$\hat{s} = \underset{s}{\text{argmin}} |As - m|_2^2 \quad (18)$$

where $|\cdot|_2$ represents the 2-norm of a vector, ŝ is the vectorized reconstructed source map, A is the transform matrix, m is the vectorized measurement and s is the vectorized source. (NOTE: the transform matrix here is no longer a square matrix due to the over sampling, its column size is smaller than the row size)

In addition, as the source map could not contain any negative source term, one can write the optimization problem in the following standard form:

minimize $|As-m|_2^2$ subject to $s \succeq 0$ (19)

This method will be hereafter referred to as non-negative least square (NNLS).

In the mathematics parsing software MATLAB, the optimization problem in Eq. 19 can be solved by using the function 'lsqnonneg'.

The least square objective function could become more flexible if regularization is performed. A more general form could be expressed as:

minimize $\langle c, (As-m)^2 \rangle + \alpha R_1(s) + \beta R_2(s) + \ldots$ subject to $\succeq 0$ (20)

where $\alpha$, $\beta$ is the weights for the regularize term $R_1$, $R_2$, $\langle \cdot \rangle$ is the inner product, c is the weight for the square error between the obtained measurement and reconstructed measurement.

For the weighted least square, one can weigh the measurement with a smaller value less, as the noise is higher. In addition, in the following disclosure, it will be shown that the measurement collected away from the source can be weighted less when doing the reconstruction.

To use the regularize term, additional information of the source map must be given. One typical regularization term in image processing is the one norm regularization: $R_1(s) = |s|_1$. With an appropriate weight, this term can introduce sparsity, which is suitable for point source reconstruction.

For source mapping, the non-negative constrain could be added, so that the optimization problem can be rewritten as in Eq. 21.

minimize $|As-m|_2^2 + \alpha |s|_1$ subject to $s \succeq 0$ (21)

This optimization problem is equivalent to:

minimize $s^T A^T A s + (\alpha 1^T - 2m^T A)s + m^T m$ subject to $s \succeq 0$ (22)

A Quadratic Programming solver, hereafter referred to as the QP method, can solve this simplified problem efficiently. The performance of this regularization term will be shown herein below in comparison to other methods.

In the mathematics parsing software MATLAB, the 'quadprog' function can be used to solve the problem in Eq. 22 and, for a more general case, i.e. Eq. 20, one may use the CVX toolbox, as long as the optimization problem is convex.

Results for Reconstruction Method

In this section, results will be shown using the solution methods details herein. Trade-offs between each method will be analyzed based on the result. The navigation algorithm will then be developed using one of the methods. Parameters that will affect the navigation algorithm's result will also be analyzed herein.

MAP vs. QP vs. NNLS

So far, three methods have been introduced to solve the reconstruction problem. As introduced above, the use of MAP is limited to the cases when there is a prior knowledge of the source distribution.

In this section, two different situations will be introduced for analyzing the trade-off between these methods. Map location, pixel distance, and number of pixels are the same for the source and the measurement so that MAP can be directly compared to the other two methods.

The first situation is the point source reconstruction. The result is shown in FIG. 11 and FIG. 12.

The ground truth for high noise is a source with strength 1 in the center, and 30 for low noise case, i.e. higher signal to noise ratio. This result suggests that when doing a point source reconstruction, the QP method has the best performance. This is as expected, since the 1-norm term is enforcing sparsity.

The second situation shows the mapping of a distributed source. The result is shown in FIG. 13 and FIG. 14.

The ground truth for high noise is a region of sources with an identical strength 1 in the center area, and 30 for the low noise case. This result suggests that our proposed MAP method is more suitable for doing the distribution reconstruction.

In general, NNLS can be used as a standard method when little knowledge is given about the situation.

We proved that MAP and QP perform better than NNLS, however they require some prior information. A possible approach could be to attempt a rough image reconstruction using the NNLS method at first and using the reconstructed image as prior information for MAP or QP.

Navigation Algorithm—Single Region

The navigation algorithm can be seen as an application of the previous reconstruction algorithms. For simplicity, only the NNLS is used for developing the navigation algorithm. However, one may use the MAP and QP instead, if prior knowledge is given.

For a single region navigation problem, it means that one could assume that all sources are located within one target area, the exact location of this particular region is unknown, and the source could have any distribution within the region.

An example of a 16 regions test case is reported in FIG. 15.

In this example, we first create a well-defined radiation field, whose size is 1024*1024-pixel, and we divide the whole radiation or produced signal field into 4*4 regions as shown in FIG. 15 (the lines). For this test, we assume that all radiation sources are within one of the 16 regions. Then we get the starting samples from the field center as the white dots are showing. Afterwards, the algorithm will guide the detector to another sample place, collect the additional measurement, update the reconstruction results and then repeat this process and eventually guide it to locate the source region. Through this process, the reconstructed source map in this test case is always defined as the crosses (X).

The pseudo code for the navigation algorithm follows:

---
Navigation algorithm-Single region
---
sample at the starting location, calculate A solve $\mathrm{argmin}_s |As - m|_2^2$ s.t. $s \geq 0$ for i=1:max_iteration
  1) Let the drone fly to the region center with highest reconstructed value
    2) Sample a new patch of measurement, pale it together with the existing measurement and form the new measurement vector m_i, calculate the new $A_i$ 3) Solve $\mathrm{argmin}_s |A_i s - m\_i|_2^2$ s.t. $s \geq 0$ if the drone is not moving
    break
  end
end
reshape s into matrix S and get the final result

---

Before analyzing the factors that can influence the reconstructed result, we show a successful reconstruction in the following example.

Parameters Include:

TABLE 1

| Parameters of the navigation algorithm test problem | |
|---|---|
| Source location | ideally located at the top left corner cross shown in FIG. 15 |
| Source strength | 100 |
| Grid distance | 0.01 m |
| Sample rate | 1:5 |
| Sample size | 5*5 |
| Fly distance | Half way to target region |
| Iteration | 20 |

The results of this test problem are shown in FIG. 16.

Source Location Influence

In this and the following sections, the parameter's influence on the results of the navigation algorithm will be analyzed. This section will show the source location influence, which is more like a resolution problem.

The conclusion is clear, if the source is located right on the reconstructed map (crosses shown in FIG. 10), then there will be no resolution error, the further away, the higher the error will be. This can be shown by creating a moving source test case. FIG. 17 shows our source moving track and sample location.

As shown in FIG. 17, the samples location is fixed at the center of the field, while the source is moving on the white line. To compare the error, instead of comparing the error between the original source map and the reconstructed map directly, we choose to compare the measurement map generated by the two maps (the measurement map for the original source is the samples itself, the one for the reconstructed map needed to be calculated by a convolution operation). This is because for most of the time, there exist a huge error between two source maps, and the error drops to almost zero abruptly when the source hit the crosses in FIG. 17. Hence, the NMSE in FIG. 18 is not comparable to other NMSE plots.

The result of source location (left to right) as a function of the measurement error (NMSE) is shown in FIG. 18. This result shows the reason why we want to assume the ideal source location assumption. In this test case, it clearly shows that even if there is no noise, the error could still be very high due to this source location influence. Though one may always be facing this non-ideal location problem in reality, we do not want to introduce this kind of error when presenting our recommended navigation algorithm as it contains another type of error.

Sample Location Influence

According to the navigation algorithm, in each iteration, after the reconstruction step, we let the drone fly towards the highest score region. In this part, we will show the reason why we are setting this principle.

We provide another test case to explain this reason in FIG. 19. The basic set up is similar to the simple source example (FIG. 15), the field map is sized 512*512, but this time the source is fixed at (320,192), then we move our sample center on the white line shown in the picture, from the left top to the right bottom. In this test, we compare the error between the original source map and the reconstructed map directly, and the square error is an average error over 50 reconstruction times for every location.

In addition, one big difference between this test and the one shown in FIG. 13 is that the noise level is defined differently. In this test, instead of using $N(0, m_{ideal})$, the noise is defined as $N[0, (\alpha\ \% \times m_{ideal})^2]$. The new form of noise definition controls the noise level for every pixel to be equal. This is the requirement for analyzing the sample location influence. Otherwise, in the original noise definition, samples collected further away from the source will have bigger noise.

The result is shown in FIG. 20. This result shows that when it is an ideal no noise case, no matter how further away, the reconstruction is always ideal. However, once noise is added, even under a uniform noise level assumption, measurements collected away from the source will result in a high reconstruction error. Thus, to check whether there is a source at a particular location, one must get some samples near that location. Hence, our algorithm chooses to let the detector collect samples at the location with the highest reconstruction value in the last iteration to confirm whether there is a source or not.

Other Parameters

The remaining factors, including source strength, grid distance, sample rate, sample size, and fly distance will all be discussed in this part, as the influence for these factors are either easy to understand, or are similar to former factors.

Source strength: as the noise is defined as $N(0, m_{ideal})$, the higher the source strength is, the higher the measurement will be, resulting in a higher signal to noise ratio.

Grid distance: The grid distance is the distance between these pixels in FIG. 10, the size for the radiation field is 1024*1024 pixel. This parameter represents the blurriness level described above—the smaller this number is, the higher the blurriness level will be.

Sample rate: when collecting the measurements on the radiation field from $x_1$ to $x_2$, the samples we obtain is $x_1$: sample rate: $x_2$. (For example, if the sample rate is 1:5, and the sample location starts from 100 to 120, then the measurement will be at 100, 105, 110, 115, and 120) Intuitively, the higher the sample rate is, the better the reconstruction result will be.

Sample size: Sample size means how many samples are collected in one iteration. As expected, the more samples are collected, the better the reconstruction will be.

Flight distance: This is purely a navigation strategy, set it to half way to target region or directly to target region will not influence the reconstruction result directly. Rather, this factor will influence how many iterations are needed for convergence. The trade-off is when setting it to directly fly to target region, the detector might spend a long time on moving.

Using all the results above, in this part, we present the algorithm for finding sources located in multiple regions. The pseudo code for the navigation algorithm is:

| Navigation algorithm-Multi region |
|---|
| sample at the starting location, calculate A |
| solve $\text{argmin}_s \|As - m\|_2^2$ s.t. $s \geq 0$ |
| find the first source region |
| for i=1:max_iteration |
|   1) Let the drone fly to the region center with highest reconstructed value |
|     2) Sample a new patch of measurement, pale it together with the existing measurement and form the new measurement vector $m_i$, calculate the new $A_i$ |
|   3) Solve $\text{argmin}_s \|A_i s - m_i\|_2^2$ s.t. $s \geq 0$ |

| Navigation algorithm-Multi region (continued) |
|---|
|   if the drone is not moving |
|     break |
|   end |
| end |
| generate modify measurement |
| Record the source map for the first source as: $s_1 = s[s == \max(s)]$ |
| Use $s_1$ to simulate a no noise measurement map. Record it as $m_{modify\_1}$ |
| Use the A in the last iteration for finding the first source |
| solve $\text{argmin}_s \|As - (m - m_{modify\_1})\|_2^2$ s.t. $s \geq 0$ |
| find the source in another region |
| Redo the process for finding the first source, with the following optimization problem: |
| $\text{argmin}_s \|A_i s - (m_i - m_{modify\_1})\|_2^2$ s.t. $s \geq 0$ |
| Record the source map for the second source as: $s_2 = s[s == \max(s)]$ |
| Continue, until all sources are found |
| Get final reconstruction result as: $s_{final} = s1 + s2 + \ldots$ |
| reshape $s_{final}$ into matrix S and get the result |

Under the same parameters of Table 1, an example result for the above algorithm is shown in FIG. 21.

When finding the second source, since we already have enough samples from the first round, we can then let the drone fly directly (instead of half way) to the guessed source location. This will enable the drone finding the second source much more efficiently. As it is shown in FIG. 22, only two additional sample patches were collected for finding the second source.

After getting this navigation algorithm, one can combine this algorithm with the deconvolution method mentioned above, i.e. one can use the navigation algorithm to roughly find an interest region, then do the sampling over the interest region and use the deconvolution method to reconstruct the source distribution within this region.

Conclusions and Future Work

We generalized image reconstruction algorithms to solve the inverse problem of extracting a spatial map of an unknown radiation source from the corresponding measured radiation or signal map. The reconstructed map is given as input to a navigation algorithm for radiation or signal mapping and source search.

The convolution algorithm was solved using a MAP estimator, however other unfolding methods, such as maximum likelihood expectation maximization, minimum mean square error can also be used.

The proposed approach relies on a single detector, however more complex measurement systems can in principle be used without increasing algorithm complexity, but only the amount of data to be processed.

The matrix representation we used is very flexible. One can fit three-dimensional data into the matrix representation and perform the reconstruction accordingly. This way, the assumption of having a flat radiation source and a minimum source-to-detector distance of 1 m will no longer be needed.

Herein, we described qualitatively the sensitivity of the navigation algorithm to several parameters, e.g. flight distance and spatial sampling rate. We plan to extend this analysis and quantify the effect of these parameters on the performance of the navigation algorithms, in terms of number of iteration steps needed for the algorithm to converge.

It should be understood that although the present discussion has been focused on ionizing radiation, the present teachings are applicable to use with chemicals. This is particularly true because of laser induced backscatter spectroscopy and miniature mass spectroscopy devices. It may (or may not, depending upon the chemical sensor) be necessary to couple the approach with dispersion or other environmental transport models. Necessary data about wind speed and direction as a function of position could be simultaneously collected by drones as they move around in order to improve such modeling.

Construction of quantitative maps of sources of ionizing radiation, radiofrequency signals, chemical contaminants, or particulate contaminants as a function of position using image reconstruction (large number of possibilities) or artificial intelligence techniques (big data/neutral nets) large number of possibilities can be completed based upon measurements made at two or more locations.

It should be understood that the contaminant or environmental sources can be in solid, liquid, or gas forms. The environment through which the contaminant or ionizing radiation moves can be air, water, soil, rock, or through human made structures. One or more types of radionuclides, chemicals, or particulates can be determined and a variety of methods of constructing the map (mathematical models, computer solutions, AI or neural nets; reconstruction methods) can be used. Point or planar imaged measurements of ionizing radiation or contaminant intensity can be used. Moreover, information about sizes of visible images in the field can be used to enhance the contaminant or radiation source maps. Supplementary information about local meteorological conditions (e.g. wind speed, wind direction, particulate concentrations, temperature, pressure, or humidity) can also be used to improve the results. Still further a priori information about the nature of the contaminants (e.g. relative ratios of different types of contaminants, energy, size, mass, particulate size, or other parameters affecting dispersion in the environment) can be used. Moreover, a simple model of the variation of radiation intensity as a function of distance from a radiation source can be used. Furthermore, images of radiation levels rather than point measurements of radiation levels can be used. A more complicated model of the variation of ionizing radiation intensity as a function of distance from a radiation source, which includes scatter, attenuation, and/or reflection due to materials present in the environment, can be used. Such models may take into account pre-existing knowledge of the materials, or infer their presence from the measured data in a simple or iterative way as the source maps evolve. Simple and more complicated models of a variety of forms of environmental transport of chemical and particulate contaminants relating the measurements of the contaminants at various points to their sources as changed by the environmental transport processes are likewise useful. Models that use changes in the size and intensity of planar imaged contaminant levels registered at different positions are still further useful.

Optimization of the path or paths of one or more moving sensors to locate one or more sources of ionizing radiation or environmental contaminants (including chemicals or particulates) through the use of reconstructive/artificial intelligence methods, which continuously refine the knowledge of the source as more measurements are accumulated or other information becomes known, are anticipated in connection with the present disclosure.

Still further, it should be understood that the estimation method described herein can be a neural network module, such as, for example, RNN and/or LSTM. To this end, the network can continually output a new x,y coordinate to guide a drone based on the current available sample points.

Additionally, information from one or more fixed detectors may be combined with one or more moving detectors during implementation of the method.

The approaches may be used to note changes in the sources as a function of time by continuously reconstructing source maps based upon new measurements Finally, it is noted that the principles of the present teachings can be useful in connection with any sources that has a $1/R^2$ decaying property, such as electromagnetic field. Radiofrequency signals and gamma rays are both examples. In fact, as long as changes in source strength are known as a function of distance from the source, mapping and intelligent navigation may be applied. This is the case for the distribution of chemicals in the environment, for which their distribution in space is accounted for by an environmental model incorporating wind if airborne, or known patterns of water flow and contaminant settling in rivers. Such cases suffer from potential complexities, but the methods disclosed in the present teaching are equally applicable.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rapid characterization system for detecting a source, the source includes an ionizing radiation source for generating a source signal, the rapid characterization system comprising: a detector configured to measure a level of a source signal generated by the source with the detector at a first position relative to the source and to measure a level of the source signal from a second position relative to the source that is different than the first location and output corresponding measurement signals; and an algorithm system configured to receive the measurement signal from the first position and creating a first source location map of the position of the source based on the source signal generated by the source and navigating the detector to the second position based upon the first source location map and creating a second source location map from the measurement signal from the second position.

2. The rapid characterization system according to claim 1 wherein the algorithm system is configured to determine the second position of the detector to optimize data collection and creation of the source location map.

3. The rapid characterization system according to claim 1 wherein the detector comprises a plurality of detectors each configured to measure the level of the source signal generated by the source.

4. The rapid characterization system according to claim 3 wherein at least one of the plurality of detectors is stationary within a first portion of an area of interest.

5. The rapid characterization system according to claim 3 wherein at least one of the plurality of detectors is movable within a first portion of an area of interest.

6. The rapid characterization system according to claim 1 wherein the algorithm system further is configured to determine a desired location of a second source based on the source location map.

7. The rapid characterization system according to claim 1 wherein the detector is a spectroscopic detector.

8. A method of rapid characterization of a source, the source includes an ionizing radiation source for generating a source signal, the method comprising: measuring a level of the source signal generated by the source using a-detector from a first position relative to the source and moving the detector to a second position different than the first position and measuring the source from the second position and outputting corresponding measurement signals; and receiving the measurement from the first position and creating a first source location map of the position of the source based on the source signal generated by the source and navigating the detector to the second position based upon the first source location map and creating a second source location map from the measurement signal from the second position.

9. The method according to claim 8, further comprising:
determining an optimized position of the first and second positions of the detector to optimize data collection and creation of the source location map and moving the at least one detector to the optimized position.

10. The method according to claim 8 wherein the measuring a level of the source signal generated by the source comprises measuring an electromagnetic level of the source signal generated by the source.

11. The method according to claim 8 wherein the measuring a level of the source signal generated by the source using the detector comprises measuring the level of the source signal generated by the source using a plurality of detectors.

12. The method according to claim 11 further comprising moving at least one of the plurality of detectors.

13. The method according to claim 8 wherein the measuring the level of the source signal generated by the source comprises measuring the level of the source signal generated by the source in at least one of air, water, soil, rock, or a human made structure.

14. The method according to claim 8 wherein the measuring the level of the source signal generated by the source comprises measuring a radionuclide or chemical.

15. The method according to claim 8 wherein the receiving the measurement signals and creating the source location map of the position of the source comprises receiving the measurement signals and creating the source location map of the position of the source using mathematical models, computer solutions, artificial intelligence or neural nets, or reconstruction methods.

* * * * *